US011372913B2

(12) United States Patent
Caligor et al.

(10) Patent No.: US 11,372,913 B2
(45) Date of Patent: *Jun. 28, 2022

(54) METHOD AND APPARATUS FOR REMOTE DIGITAL CONTENT MONITORING AND MANAGEMENT

(71) Applicant: SOUNDSTREAK TEXAS, LLC, Marshall, TX (US)

(72) Inventors: Dan Caligor, New York, NY (US); David Coleman, New York, NY (US)

(73) Assignee: SOUNDSTREAK TEXAS LLC, Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/940,157

(22) Filed: Jul. 27, 2020

(65) Prior Publication Data
US 2020/0357372 A1 Nov. 12, 2020

Related U.S. Application Data

(63) Continuation of application No. 15/495,922, filed on Apr. 24, 2017, now Pat. No. 10,726,822, which is a
(Continued)

(51) Int. Cl.
*G06F 16/58* (2019.01)
*G10H 1/00* (2006.01)
(Continued)

(52) U.S. Cl.
CPC ............. *G06F 16/58* (2019.01); *G06Q 10/10* (2013.01); *G06Q 30/0247* (2013.01);
(Continued)

(58) Field of Classification Search
CPC ........ G06B 13/19669; G06B 13/19695; G06B 13/19643; H04N 7/181; H04N 21/4341; H04N 21/4394; H04N 21/44231; H04N 21/42646; H04N 21/2368; H04N 21/42669; H04N 21/47214; H04N 21/4184;
(Continued)

(56) References Cited

U.S. PATENT DOCUMENTS 6,067,566 A 5/2000 Moline
6,366,914 B1 * 4/2002 Stern ..................... G06Q 30/02
(Continued)

*Primary Examiner* — Kyung H Shin
(74) *Attorney, Agent, or Firm* — Charles A. Rattner

(57) ABSTRACT

A desktop application and supporting web site for capturing audio and video recordings or other digital content of differing modalities is introduced, wherein multiple participants in a collaborative session may be in separate remote locations. The application includes providing a high quality data format for transferring recordings, audiovisual data and the like to a remote network location or computer and a real-time data format for intercommunicating comments and instructions that are not recorded. Peer-to-peer and server-client implementations may be optimized regarding delivery time (latency) versus content quality. The desktop application also provides mechanisms for playing back sound, video or other data for participants' reference, along with synchronized presentations of textual, audio and visual material corresponding to the session.

20 Claims, 6 Drawing Sheets

Related U.S. Application Data continuation-in-part of application No. 14/966,917, filed on Dec. 11, 2015, now Pat. No. 9,635,312, which is a continuation-in-part of application No. 13/220,482, filed on Aug. 29, 2011, now abandoned, which is a continuation-in-part of application No. 12/563,868, filed on Sep. 21, 2009, now abandoned, which is a continuation of application No. 11/663,986, filed as application No. PCT/US2005/034850 on Sep. 27, 2005, now Pat. No. 7,592,532.

(60) Provisional application No. 60/613,572, filed on Sep. 27, 2004.

(51) Int. Cl.

| | | |
|---|---|---|
| *H04N 7/15* | (2006.01) | |
| *H04N 5/77* | (2006.01) | |
| *H04N 5/765* | (2006.01) | |
| *H04N 9/802* | (2006.01) | |
| *G06Q 10/10* | (2012.01) | |
| *G11B 27/034* | (2006.01) | |
| *G11B 27/34* | (2006.01) | |
| *G06Q 30/02* | (2012.01) | |
| *H04N 21/434* | (2011.01) | |
| *H04N 21/439* | (2011.01) | |
| *H04R 27/00* | (2006.01) | |

(52) U.S. Cl.
CPC ......... *G10H 1/0058* (2013.01); *G11B 27/034* (2013.01); *G11B 27/34* (2013.01); *H04N 5/765* (2013.01); *H04N 5/77* (2013.01); *H04N 7/15* (2013.01); *H04N 9/802* (2013.01); *H04N 21/4341* (2013.01); *H04N 21/4398* (2013.01); *G06Q 30/02* (2013.01); *G10H 2240/046* (2013.01); *G10H 2240/175* (2013.01); *G10H 2240/305* (2013.01); *H04R 27/00* (2013.01); *H04R 2227/003* (2013.01); *H04S 2400/15* (2013.01)

(58) Field of Classification Search
CPC ........... H04N 21/4147; H04N 21/4398; H04N 21/4135; H04N 21/4334; H04N 21/4627; H04N 21/439; H04N 21/4402; H04N 5/76; G06F 16/58; G08B 13/19695; G08B 13/19669; G08B 13/19643; G06Q 30/0247; G06Q 30/06; G06Q 30/0641; G06Q 30/0249; G06Q 30/0254; G06Q 30/0268; G06Q 30/02; G11B 27/034; G11B 27/34

See application file for complete search history.

(56) References Cited

U.S. PATENT DOCUMENTS

| | | |
|---|---|---|
| 6,482,087 B1 | 11/2002 | Egozy et al. |
| 6,614,729 B2 | 9/2003 | Griner et al. |
| 6,653,545 B2 | 11/2003 | Redmann et al. |
| 6,924,425 B2 | 8/2005 | Naples et al. |
| 7,076,561 B1 | 7/2006 | Rosenberg et al. |
| 7,078,607 B2 | 7/2006 | Alferness |
| 7,087,829 B2 | 8/2006 | Hasegawa et al. |
| 7,129,408 B2 | 10/2006 | Uehara |
| 7,191,023 B2 | 3/2007 | Williams |
| 7,297,858 B2 | 11/2007 | Paepcke |
| 7,396,993 B2 | 7/2008 | Tada |
| 7,433,881 B1 * | 10/2008 | Hill .................. G06F 16/58 |
| 7,478,327 B1 * | 1/2009 | Reid .................. G06F 3/005 |
| | | 715/719 |
| 7,518,051 B2 | 4/2009 | Redmann |
| 7,592,532 B2 | 9/2009 | Coleman |
| 7,758,427 B2 | 7/2010 | Egozy |
| 2002/0053078 A1 | 5/2002 | Holtz et al. |
| 2002/0133412 A1 | 9/2002 | Oliver et al. |
| 2002/0136531 A1 | 9/2002 | Harrradine et al. |
| 2002/0162445 A1 | 11/2002 | Naples et al. |
| 2002/0163577 A1 * | 11/2002 | Myers ............. G08B 13/19669 |
| | | 348/152 |
| 2003/0159566 A1 | 8/2003 | Sater et al. |
| 2003/0164084 A1 | 9/2003 | Redmann et al. |
| 2003/0220813 A1 | 11/2003 | Gurvey |
| 2003/0227479 A1 | 12/2003 | Mizrahi et al. |
| 2004/0105505 A1 | 6/2004 | Kitamura |
| 2005/0056141 A1 | 3/2005 | Uehara |
| 2005/0120373 A1 * | 6/2005 | Thomas ............. H04N 21/4398 |
| | | 725/58 |
| 2005/0138560 A1 | 6/2005 | Lee et al. |
| 2005/0172790 A1 | 8/2005 | Tada |
| 2007/0039449 A1 | 2/2007 | Redmann et al. |
| 2007/0140510 A1 | 6/2007 | Redmann |
| 2007/0245881 A1 | 10/2007 | Egozy et al. |
| 2008/0065976 A1 | 3/2008 | Kobayashi et al. |
| 2008/0113797 A1 | 5/2008 | Egozy |
| 2009/0038468 A1 | 2/2009 | Brennan |
| 2010/0095829 A1 | 4/2010 | Edwards |
| 2010/0142926 A1 | 6/2010 | Coleman |
| 2010/0319518 A1 | 12/2010 | Mehta |
| 2011/0011244 A1 | 1/2011 | Homburg |
| 2011/0011245 A1 | 1/2011 | Adam et al. |
| 2012/0236160 A1 | 9/2012 | Rezek et al. |
| 2012/0297958 A1 | 11/2012 | Rassool et al. |
| 2013/0025437 A1 | 1/2013 | Serletic et al. |

* cited by examiner

```
INVITE sip:user-to-be-invided@SOUNDSTREAK.com SIP/2.0
Via: SIP/2.0/UDP ddd.ddd.ddd.ddd
To: <sip: user-to-be-invided@SOUNDSTREAK.com>
From: My Name <sip:my-user-id@SOUNDSTREAK.com>
Call-ID: ???????@SOUNDSTREAK                    reserved
Cseq: invide-command-count INVITE
Contact: <sip:my-user-id@SOUNDSTREAK.com>   reserved
        Referred-By: < . . . >                       reserved
            Content-Length: ?????

PROJECT=
            FTP-Port=ddddd
            RTP-TCP-PORT=ddddd
            AVAILABLE-RECORDING=dddddd
            OS=******
            NET-STATUS=***,***,***,***
            ...
```

FIG. 5

```
<?xml version="1.0" encoding="ISO-8859-1"?>
    <project name="*" video="****.*">
      <take id="01" description="***..." time="ddddddd...">
        <script id="*" speaker="**" time="ddddddd...">
              . . . script content . . .
        <script>
        <script id="*" speaker="**" time="ddddddd...">
              . . . script content . . .
            <script>
              . . .
    </take>
        <take id="02" description="***..." time="ddddddd...">
    </take>
    </project>
```

FIG. 6

```xml
<?xml version="1.0" encoding="ISO-8859-1"?>
    <report announcer="*" producer="*"
            submitTime="dddddd..."
            machine="ip-address" project="***">
        <recording id="***"
            startTime="dddddd..." endTime="dddddd..."
            firstSubmitTime=" dddddd..." failedCount="ddd">
        </recording>
        <recording id="***"
            startTime="dddddd..." endTime="dddddd..."
            firstSubmitTime=" dddddd..." failedCount="ddd">
        </recording>
        . . .
    </report>
```

FIG. 7

METHOD AND APPARATUS FOR REMOTE DIGITAL CONTENT MONITORING AND MANAGEMENT

CROSS-REFERENCE TO RELATED APPLICATIONS

This application claims priority under 35 U.S.C. § 120 as a continuation of U.S. patent application Ser. No. 15/495,922 entitled "METHOD AND APPARATUS FOR REMOTE DIGITAL CONTENT MONITORING AND MANAGEMENT" filed in the name of Caligor et al., and issued as U.S. Pat. No. 10,726,822 on Jul. 28, 2020, which claims priority under 35 U.S.C. § 120 as a continuation-in-part of U.S. patent application Ser. No. 14/966,917 entitled "METHOD AND APPARATUS FOR REMOTE VOICE-OVER OR MUSIC PRODUCTION AND MANAGEMENT" filed in the name of Caligor et al. on Dec. 11, 2015, and issued as U.S. Pat. No. 9,635,312 on Apr. 25, 2017, which claims priority under 35 U.S.C. § 120 as a continuation-in-part of U.S. patent application Ser. No. 13/220,482 entitled "METHOD AND APPARATUS FOR REMOTE VOICE-OVER OR MUSIC PRODUCTION AND MANAGEMENT" filed in the name of Caligor et al. on Aug. 29, 2011, which claims priority under 35 U.S.C. § 120 as a continuation-in-part of U.S. patent application Ser. No. 12/563,868 entitled "METHOD AND APPARATUS FOR REMOTE VOICE-OVER OR MUSIC PRODUCTION AND MANAGEMENT" filed in the name of David J. Coleman on Sep. 21, 2009, which is a continuation of U.S. patent application Ser. No. 11/663,986 entitled "METHOD AND APPARATUS FOR REMOTE VOICE-OVER OR MUSIC PRODUCTION AND MANAGEMENT" filed in the name of David J. Coleman on Mar. 27, 2007, and issued as U.S. Pat. No. 7,592,532 on Sep. 22, 2009, which in turn claims the benefit under 35 U.S.C. § 371 as a National Stage filing corresponding to PCT Patent Application Ser. No. PCT/US2005/034850 entitled "METHOD AND APPARATUS FOR REMOTE VOICEOVER OR MUSIC PRODUCTION AND MANAGEMENT" filed in the name of David J. Coleman on Sep. 27, 2005, which claims priority in the United States of America under 35 U.S.C. § 119 to U.S. Provisional Patent Application Ser. No. 60/613,572 entitled "METHOD AND APPARATUS FOR REMOTE VOICEOVER OR MUSIC PRODUCTION AND MANAGEMENT" filed on Sep. 27, 2004 in the name of David J. Coleman, the entirety of each of which are hereby incorporated by reference.

FIELD OF THE INVENTION

This invention generally relates to data processing involving the management of audio and video recording and other digital data modalities.

BACKGROUND OF THE INVENTION

Remote audio recording typically involves several distinct steps, and several parties. The steps are auditions, signing a contract, scheduling a session, recording a performance, delivering recorded takes to an editor or other recipient, paying for services rendered, and reconciling accounts. Typically, there are a minimum of three parties involved, fulfilling several roles including: the artist who performs; the agent who manages the artists' affairs; the producer who handles business and logistical affairs for the production; the director who provides instruction to the artist; the engineer who manages technical setup and operation of the recording equipment; the editor or technician who manipulates the resulting audio files; the sponsor of the project who may be an advertising client, television or studio executive, or corporate sponsor. In many cases one individual will perform several of these roles.

In the endeavor of voice-over, video and music production for audio or audio-visual media, such as commercials, advertisements, television programs, movies, and the like, there are a variety of costs in completing such productions. These costs generally include studio rental, travel expenses, and salaries for production staff and the talent employed for the production.

In order to reduce such costs, and with the advent of high-speed data transfer over computer networks, remote recording for voice-over production has been gaining wider acceptance. Remote recording is generally accomplished today using any of a variety of available technologies. In one example used primarily in remote audio production, dedicated integrated services digital network (ISDN) lines are provided between the location of production staff and a separate location for the hired talent for purposes of communication. This high-end approach has been used for over a decade, and allows full duplex communication (2-way talking) thru the ISDN lines to manage the production. Such methods allow multiple tracks of a sound mix so that talent may read a script while hearing audio tracks in their headphone. However, such setups require expensive encoding and decoding hardware on each end, and expensive dedicated data lines from a telecommunications provider. In the case of an audiovisual production, such setups also do not allow the talent to read the script while watching corresponding video ("read to picture"). In addition, recordings are generally made at the receiving end, usually a professional sound studio, and not in the talent's home or preferred location; this means the audio must be compressed to accommodate bandwidth limitations and can lead to lost takes if the connection is disrupted.

Another existing remote production setup involves a phone session employing file transfer protocol (FTP). In recent years, this has become a common method for remote recording. In this setup, the producer or director may call the talent on the phone and direct him or her over the phone. The talent then records the tracks on, for example, his home computer and later transfers the resulting recordings to production staff in one of several ways. However, the size of the resulting file may oftentimes be too large to send via FTP, and so the talent must edit out the unwanted parts, name the resulting file appropriately and then upload the file to a server so the Producer/Director can download it.

A still further remote production setup involves initiating a phone session for purposes of direction and management, recording the session in an MP3 or other digital format, and e-mailing or otherwise transmitting the recorded session to production staff. MP3 compression allows for file sizes that are small enough to be e-mailed or otherwise easily transferred over the Internet. However, such audio compression formats may reduce the sound quality of the recorded session, and therefore be inappropriate for use in high-quality productions.

Some producers have opted for unsupervised voice-over/music work with remote productions. In such cases, the producer/director will e-mail or fax a script to the talent, who will read it without being directed, and will then send the recorded tracks back by FTP, e-mail, or other appropriate method as described previously. However, unsupervised sessions may result in recordings, which, upon review by the production staff, prove unsatisfactory for creative or technical reasons, and so such methods have the potential to actually increase costs when remedial recording sessions are necessary.

In addition to remote voice-over and/or music production management, there are similar needs in various other technological areas for remote data monitoring and management., for example, where data latency versus quality are a concern. Accordingly, there is a need for a method and apparatus for remote data monitoring and management that addresses certain problems in existing methods and technologies, as described further herein.

SUMMARY OF THE INVENTION

It is an object of the present disclosure, therefore, to introduce various features of a method and apparatus for monitoring and managing remote data generation sessions, in which a software application enables a high-quality data format to be established for transmitting, for example, high-resolution digital data between a producer and a capture location, such as recording talent. The high-quality data format ensures no compromises are made in quality or completeness, and is transferred between session participants at whatever pace their respective computers and network connections allow. A lower quality, real-time, data format is established for allowing the producer or other session participants to monitor performances or other digital content in real time in lower-resolution (resulting in faster transmission and less latency) and also transmit verbal comments or other communication data to each other during a session. Audio-visual components, including script data, video footage with or without existing sound, audio tracks, take notes and session-specific information may be exchanged between the computers of session participants. Recording and playback of audio can be synchronized with video footage ("Read to Picture") or existing audio files (a "sound bed") to provide context to both the Talent and other session participants. When video or audio sound bed is time-coded or contains synch marks, corresponding information can be embedded in the resulting digital audio files. A variety of mechanisms for delivering high quality (uncompressed) recordings to a designated computer, email address or network location during and after the recording session are enabled. Various parties may be billed for their activities.

BRIEF DESCRIPTION OF THE DRAWINGS

Further aspects of the present disclosure will be more readily appreciated upon review of the detailed description of its various embodiments, described below, when taken in conjunction with the accompanying drawings, of which:

FIG. 5 is a representation of an exemplary format for session initiation protocol (SIP) invitations exchanged over the network of FIG. 1;

FIG. 6 is a representation of an exemplary format for take or script definition messages exchanged over the network of FIG. 1; and FIG. 7 is a representation of an exemplary format for recording time posting messages exchanged over the network of FIG. 1.

DETAILED DESCRIPTION OF THE SPECIFIC EMBODIMENTS

Figure 1:
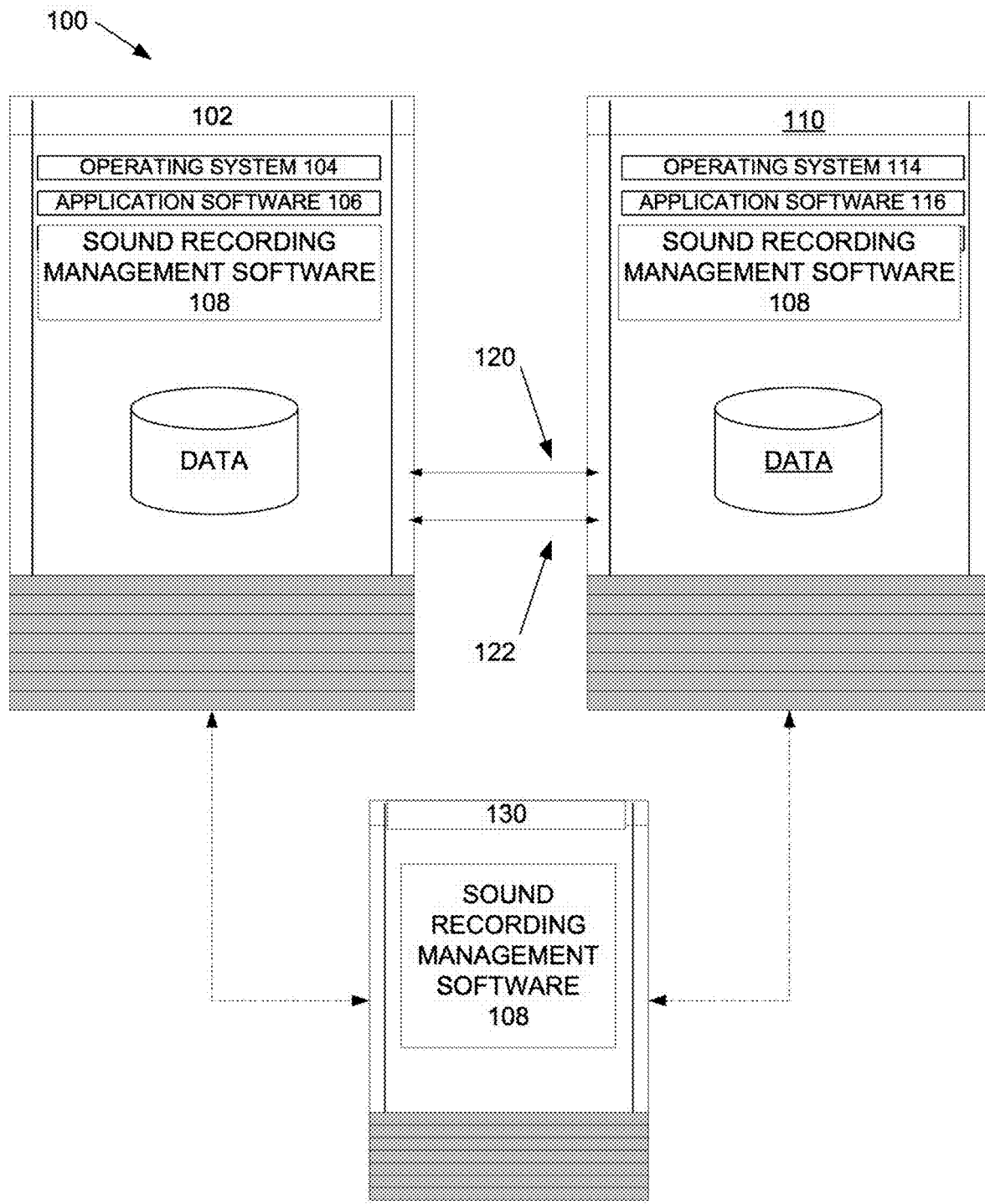
FIG. 1 is a block diagram of an exemplary computer network over which the process of the present disclosure may be performed.

As used herein and unless otherwise indicated, the following terms shall be understood to have the corresponding meanings, and any equivalents thereto, with respect to this disclosure:

SOUNDSTREAK Site: an Internet or network site for coordinating interactions between producers and talent that have desktop SOUNDSTREAK software, as well as for billing respective parties.

Producer Component: all software components resident on the producer's computer that collectively interact with the SOUNDSTREAK site and talent computers.

Talent Component: all software components resident on the talent's computer that collectively interact with the SOUNDSTREAK site and producer computers.

Common Components: SOUNDTREAK software components resident on both the producer and talent computers.

OS: operating system software for a computer.

SIP: Session Initiation Protocol for VoiP/Internet telephony.

RTP: Real-time Transport Protocol, a media transport protocol for Time-Based media data.

RTCP: RTP Control Protocol for exchanging communication statistics and status of RTP.

JMF: Java Media Framework designed by SUN MICROSYSTEMS to provide a generic specification for media processing and streaming.

VoiP: Voice Over Internet Protocol.

Audiovisual material: Video or audio content which pre-exists the SOUNDSTREAK session, and which is used during recording and playback for context. May include text, video, existing audio tracks, or any combination thereof.

Currently, many voice actors (Talent) have home studios with soundproof booths for recording remote sessions from their homes or other preferred locations. It would be advantageous to introduce a system that can avail itself of these circumstances. Accordingly, various aspects of the present disclosure may be established and performed with these existing setups, and without the introduction of new and complicated hardware.

In certain embodiments, the sound recording management software now introduced, sometimes referred to herein as SOUNDSTREAK, is a desktop application that harnesses the accessibility provided by the Internet to allow remote recording and management of voiceover/music and other forms of audio, animated and video production. SOUNDSTREAK may also operate as a web-based application, or as an application on a tablet computing device, smart phone or any other like device with sufficient processing and storage capabilities. In some embodiments, interaction between the desktop applications and/or the web-based applications will be facilitated via communication through a shared server. In other embodiments the communication will be direct, employing a peer-to-peer model. Such server-client and peer-to-peer embodiments provide separate advantages regarding optimizing the transfer of data between session participants as will be described in more detail herein below.

SOUNDSTREAK will have functionality that allows producers to audition talent, manage recordings created in other applications and the takes generated in SOUNDSTREAK sessions, and invoice parties for services rendered. In addition, the paper trail usually generated from recording sessions can now be facilitated electronically.

The core SOUNDSTREAK functionality is the "Session," a scheduled or ad-hoc appointment with the artist where one or more recordings (Takes) are made, saved to the artist's hard drive, and/or transferred to Recipient's computer(s) as appropriate. Architecturally, Sessions will be grouped under Projects, which can be defined by SOUNDSTREAK users according to their particular needs.

In some embodiments, the constituent "roles" of SOUNDSTREAK sessions will be modular, such that a given session participant will be able to fill one or more of these roles in various combinations. These roles include: Talent, the actor or musician whose performance is being recorded; Engineer, who controls the session, including setting parameters such as recording format and quality, marking selected "buy" takes for transfer, controlling playback and recording, and so on; Observer, whose role is limited to listening and/or watching audiovisual material and optionally to communicating with other participants; Sponsor, who pays for session and/or authorizes other parties to act as technical or business administrators, and Recipient, who receives transferred takes through a computer, email or FTP address or other "destination." In these embodiments, the modular roles can be combined in various ways to accommodate a variety of participation scenarios. For example, an actor may purchase a session herself (Sponsor), run the session from her computer (Engineer), select takes for automatic delivery to a network address (i.e., specify Recipient), and invite a client to observe the session (i.e., invite Observer). Alternatively, the producer may choose to run the session (as Sponsor, Engineer and Observer) and relieve the Talent of any responsibility beyond performing, while inviting additional Observers to participate in the session. The Sponsor, the Engineer, the Talent or an administrator, depending on business context, can assign roles. In such modular embodiments, it is contemplated that the software will configure itself to support the specified roles for each participant on a session-by-session basis.

In the embodiment described below, SOUNDSTREAK sessions have two distinctly defined participants: the Talent and the Producer (who fills the Sponsor, Engineer and Recipient roles as described above). However, in some embodiments, sessions may be open to any number of participants in any number of locations, with roles defined on a modular basis as described above.

In SOUNDSTREAK, a producer will set up a Session and enter all the relevant information available at the time (as detailed below). Once a Session is set up, the producer will input the script information (if applicable), select and/or upload audio-visual content (if applicable), choose a Talent, and specify all recipients of necessary communications. All account and session management data may be communicated via the Internet or any other suitable data or communications network. The actual recording process, however, may be conducted through an interface with substantial desktop functionality. The producer will be able to listen to the recording over real-time audio stream while the talent's computer simultaneously records a high-quality recording. In some embodiments, a lower-resolution Take may also be recorded to facilitate rapid transfer to the Producer for playback on their computer. Once satisfied with the takes, the producer can transfer selected high quality recordings, via quality-controlled FTP, to his or her desk-top. The producer will also have the ability to receive, play and store the high-quality recording within the client application.

SOUNDSTREAK may be a time-billed software product. In such embodiments, it may record the amount of time the producer and talent are connected in each session, and either decrement credits from the producer's pre-paid account, or generate invoices for later billing. In the case of invoice billing, SOUND STREAK will keep an internal log of connection hours used, and if the account becomes delinquent, will disable the connectivity options of the user.

Figure 2:
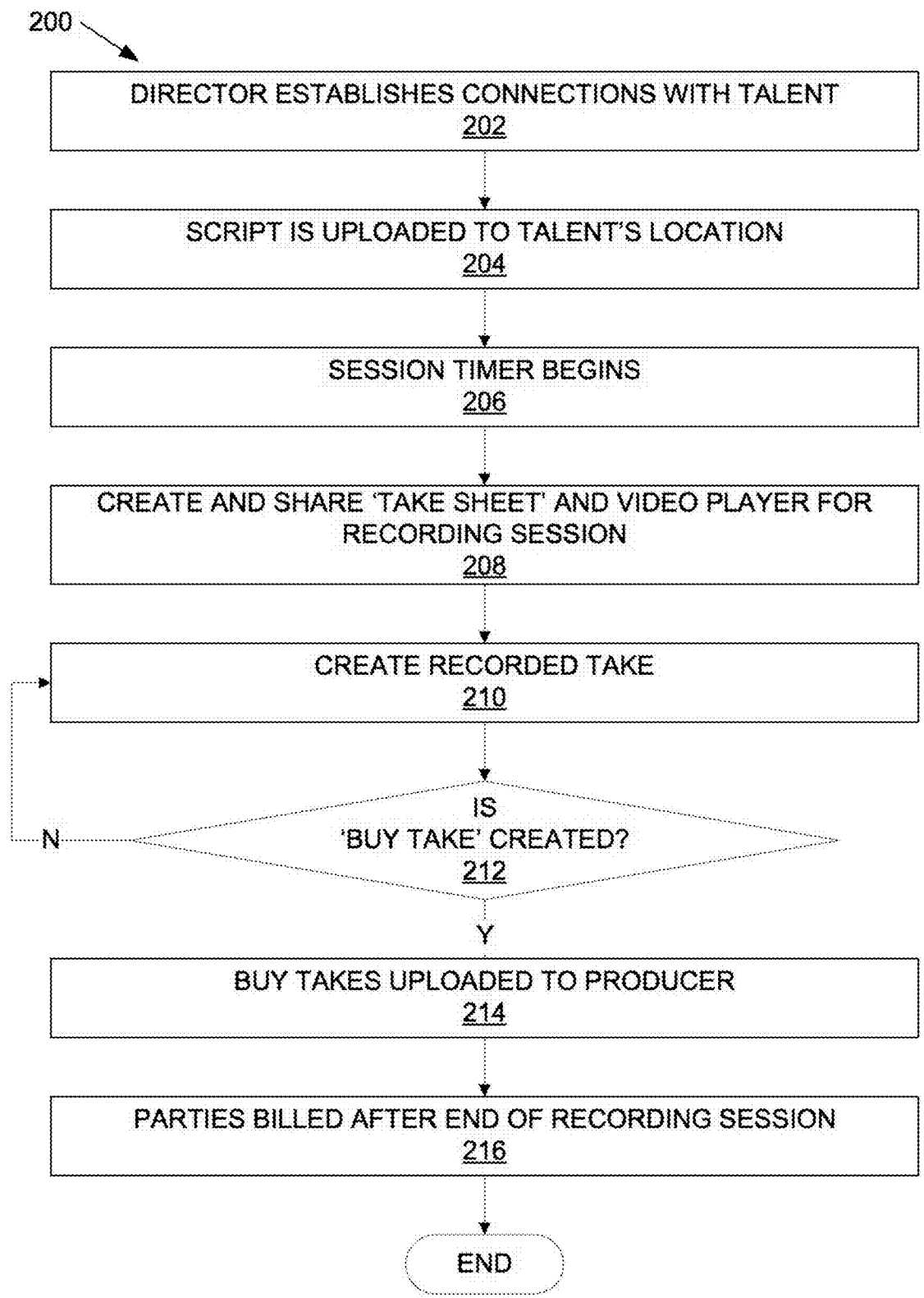
FIG. 2 is a flowchart of an exemplary process for remote recording and management that may be performed over the network of FIG. 1.
Figure 3:
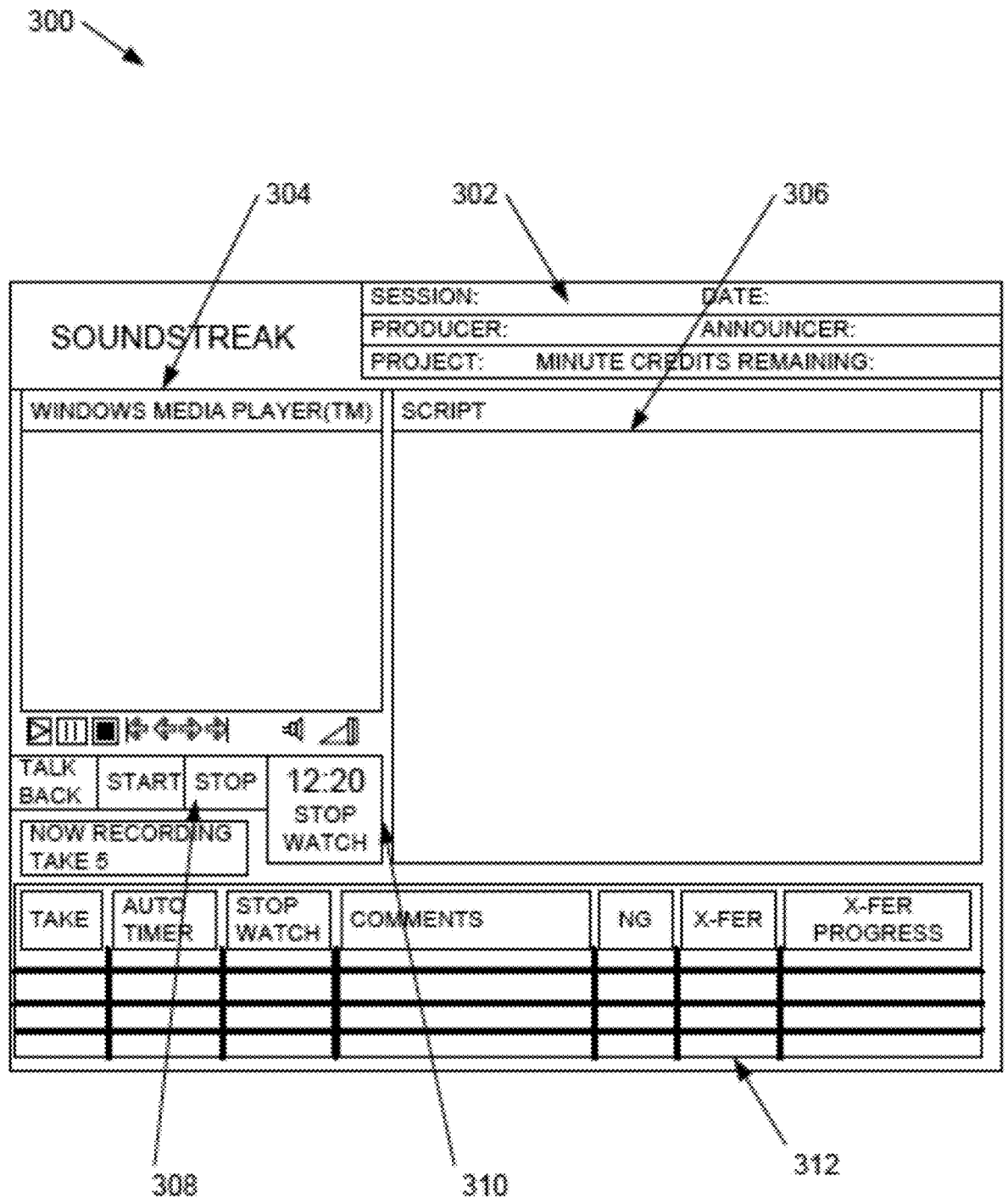
FIG. 3 is an exemplary screen display of software used for the remote recording and management process of FIG. 2.

Referring now to FIGS. 1-3, wherein similar components of the present disclosure are referenced in like manner, various embodiments of a method and apparatus for remote voiceover/music production and management are now introduced.

Turning now to FIG. 1, there is depicted an exemplary computer network 100 over which the voice-over/music production and management processes of the present disclosure may be performed. In certain embodiments, the computer network 100 may be the Internet. However, the computer network 100 may be any suitable public or private network over which the data described herein may be transferred. Accordingly, the computer network 100 may be any of a wide area network (WAN), a local area network, a wireless network, a fiber-optic network, other network technologies not yet in common use, and/or any combination of the same. The configuration provided in FIG. 1 is for purposes of example only and the present processes are not to be interpreted as being limited to such configuration.

The exemplary computer network 100 includes a production computer 102, that is operated by a producer, director, or other production staff, and further includes a talent computer 110, that is operated by an actor or actress, or musician ("Talent") hired for a production. Preferably, the data is transmitted over a high-speed data line, such as a digital subscriber line (DSL), cable modem, ISDN, T-1, T-2, T-3, fiber optic or other high-speed connection. The computers 102, 110 transmit various data in one or more high quality data formats and other data in one or more low quality data formats. In some embodiments, higher quality data may be provided over a first connection 120 while lower quality data is provided by a separate, lower quality connection. However, it is readily contemplated that the data formats may be transmitted over a single connection.

In the case of audio data, the high quality data format may be any one or more of the following conventionally used formats or the like: .AVI, uncompressed audio formats, such as WAV, AIFF, AU or raw header-less PCM and formats with lossless compression, such as FLAC, MNKEY AUDIO (.APE), WavPack (.WV), TTA, ATRAC Advanced Lossless, ALAC (.M4A), MPEG-4 SLS, MPEG-4 ALS, MPEG-4 DST, Windows Media Audio Lossless (WMA Los sless), and Shorten (SHN). The low quality or real-time data format may be any one or more of existing codecs used for VOIP (Voice Over Internet Protocol.), or other audio data formats (e.g., Formats with lossy compression, such as OPUS, MP3, VORBIS, MUSEPACK, AAC, ATRAC and Windows Media Audio Lossy (WMA)), that typically use less data space or bandwidth than the high quality formats due to the use of compression and the like. Lower quality formats may also be of the same format as the high quality formats, but instead use a lower audio sampling rate to achieve lower bandwidth usage and size. This has the advantage of reduced computer processing and network bandwidth usage during a remote production. Video and animated data formats may include any one or more of the following: .WEBM, FLASH VIDEO (.FLV), .F4V, .VOB, OGG video (.OGG), DIRAC (.DRC), .FKI, .GIF, .GIFV, MULTIPLE IMAGE NETWORK GRAPHICS (.MNG), .AVI, QUICKTIME, WINDOWS MEDIA VIDEO (.WMV), REALMEDIA (.RM), ADVANCED SYSTEM FORMAT (.ASF), MPEG-1, MPEG-2, MPEG-4, .M4V, .MVC, .SVI, 3GPP, 3GPP2, MATERIAL EXCHANGE FORMAT (.MXF), MICROSOFT RIFF, TDDD, TTDDD, 3D video formats, VRML, .DXF, ADOBE CHARACTER ANIMATOR and NULLS OFT STREAMING VIDEO (.NSV). Other available formats for audio, animated and video data capture and transmission may likewise be used.

In various embodiments, the production computer 102 and the talent computer 110 may communicate the high quality data and the low quality data over a single physical network connection. It is readily contemplated however that the computers 102, 110 may, in some embodiments, communicate via two separate data transmission lines in which high quality data (usually having a larger data size) is transmitted over a higher speed line 120, such as Integrated Services Digital Network (ISDN) services, and lower quality data is transmitted over a lower-speed transmission line 122, such as a dial-up connection.

Data may be transmitted between the computers 102, 110 using any of the variety of data formats including, but not limited to, Hypertext Transfer Protocol (HTTP), file transfer protocol (FTP) and data streaming technologies. Data transmissions may also be encrypted with any of a variety of known technologies, if desired.

Each of the production computer 102 and the talent computer 110 may be any suitable computing device used to accomplish the processes introduced. Suitable devices include personal computers, netbooks, tablet computing devices such as IP ADS or other tablet devices, smartphones, and other devices which meet the processing and storage requirements of the application or can be attached to peripherals that meet the processing and storage requirements of the application.

The production computer 102 may be, for example, a personal computer of the type commonly manufactured by IBM CORP., APPLE CORP. or SUN MICROSYSTEMS, with suitable operating system software 104 (e.g., WINDOWS XP, WINDOWS 7, MAC OS X, SUN OS), application software 106, and audio/video recording management software 108, the last of which containing programming instructions which assist production staff and talent in performing the processes herein. The audio/video recording management software 108 may be programmed in any suitable computing language, and may be a standalone application, or may be provisioned to the production computer 102 and/or talent computer 110 over the network 100 by a third party computer 130, which may act as a SOUNDSTREAK server in accordance with the descriptions that follow. In various embodiments, the audio/video recording management software 108 may also be a plugin to existing sound and video editing applications, such as AVID, FINAL CUT PRO and PROTOOLS, or a web-based application accessed through a browser.

The talent computer 110 may also be any suitable computing device, for example, a home personal computing system of the type commonly manufactured by IBM CORP., APPLE CORP., or SUN MICROSYSTEMS. The talent computer 110 also includes an operating system 114 and application software 116, which may or may not be the same as those components of the production computer 102, but which may be compatible therewith. The talent computer 110 further includes the audio/video recording management software 108, which allows the talent personnel to perform their functions as described herein below.

The following exemplary common SOUNDSTREAK software components may reside on both producer and announcer computers:

(i) Meeting Agent: When SOUNDSTREAK starts, this component will ask for user login identification (ID)/password and then communicate to a "Meeting Coordinator" to finish the session initialization. This component abstracts the implementation of a SIP client and performs functions similar to a Software Internet Phone.

(ii) Communication Handler: This component will allocate two local User Datagram Protocol (UDP) ports, used by RTP and RTCP, respectively for voice communications, and a transmission control protocol (TCP) port waiting for FTP delivery. For announcers, two extra TCP ports for RTP and RTCP shall be allocated for reliable video delivery. Then it will wait for "Meeting Agent" to inform other participants' information. After all required information is available, the component will try to initiate connections to the other participants and periodically check and ensure communication channels are still working. For media streaming channels, this component will check returned RTCP packets to ensure the channel health. This component may be expanded to use "Port Punch" or other mechanisms in order to handle communications issues such NAT or Firewall.

(iii) Resource Organizer: This component organizes resources such as video, recorded sounds, scripts and histories into a project and map each project to a disk folder. This component will help a system locate and store the related resources to facilitate recording processes.

(iv) Meeting Status Panel: This component presents the status information, such as producer names, talent names and account information.

(v) Media Stream Sender: This component delivers sound and video, for example, via RTP streaming. The implementation shall be able to do streaming via UDP or TCP based on the request type.

(vi) Resource Sender: This component delivers resources, including recorded sound files, and information to be posted, with guarantee of receipt.

(vii) Media Stream Receiver: This component receives sound and video via, for example, RTP streaming. Certain implementations are able to handle streaming via UDP or TCP-based on the request type.

(viii) Resource Receiver: This component receives resources, including recorded sound files, and information to be posted.

(ix) Video Terminal: This component plays video and provides play-time information, by either passive query or active notification, for synchronization. It also provides a play controller for users.

(x) Audio Player: This component plays audio independently. When audio can be defined as a track of multiplexed media, it shall be played together with video. This can be used in cases such as "Talk Back" described below.

(xi) Script Viewer: This component presents the current script dynamically based on the time information notified by "Video Terminal" and shows a visual signal in advance for announcers be prepared to speak out. A script panel will be presented by ScriptViewer as read-only for talent, and by a ScriptEditor for producers to edit scripts and mark the beginning time of each script element.

(xii) Operation Control Panel: This component provides buttons for those operations such as "Talk Back", "Start" and "Stop" (recording), and notifies other components of events to handle.

(xiii) Recording Status Panel: This component presents current recording status and historical information and allows producers to insert and edit comments.

(xiv) Recording Status Renderer: This component presents recording status information such as "100%" and "REC" in various styles.

(xv) Sound Capturer: This component captures voices from a microphone for either recording or talk back, and uses the "Sound Processor" component to process it. Captured sounds are then routed to the "Media Stream Sender" for real-time communications.

(xvi) Sound Processor: This component processes the recorded sound or voices to degrade it to a lower quality for fast delivery in "Talk Back" mode.

(xvii) Image Capturer: This component processes image data such as from a separate or integral digital camera and compresses the image data for transmission over the data communications network. Image data may be captured and transmitted in the image data formats described herein, or equivalents.

(xviii) Video Capturer: This component processes video data such as from a separate or integral digital video camera and compresses the image data for transmission over the data communications network. Video data may be captured and transmitted in the video data formats described herein, or equivalents.

The following exemplary SOUNDSTREAK producer components may reside on producer computers:

(i) Address Book: The producer can select talent and add them to his or her Address Book, whereby all or a select portion of a talent's information will be automatically stored on the producer's computer. This minimizes manual data entry and increases Address Book data quality control. It will also increase the size of producers' Address Books, which, from a business perspective, may increase user loyalty by creating a SOUNDSTREAK-based business asset that is non-transferable to other systems. The "Add To Address Book" functionality may initiated by selecting one or more check-boxes next to a particular name on a list of stored talent or in a search results page pertaining to stored talent.

(ii) Script Editor: This component is similar to Script Viewer, except it provides buttons to mark the starting time of each take and script element.

(iii) Script Time Marker: This component allows producers to mark time for scripts. Producers edit scripts by watching the video and control the play controller. Producers then mark the script at the right time by clicking on a marking button. The time information of the mark will be stored and used to provide visual support for talent to do recording.

The following exemplary SOUNDSTREAK talent components may reside on talent computers:

(i) Recording Status Reporter: This component posts recording status information, based on defined timing, to producers for status update and SOUNDSTREAK Site for payment records.

(ii) Recording Timer: This component keeps track of time information for each take and the current recording as well as reporting progress SOUNDSTREAK will specify, for each type of user (producer, talent, or other session participant) what the minimum and optimal configuration is with respect to operating system, random access memory (RAM), memory space, and the like, given the functionality available to that user type. In addition, SOUNDSTREAK may require talent to provide an external hard drive of a specified size, dedicated exclusively to SOUNDSTREAK. In such cases, SOUNDSTREAK will further specify partition criteria to allow for optimum "simultaneous" writing (recording) and reading (FTP transfer). Part of this optimization may require background file relocation within the specified memory device. SOUNDSTREAK may secure exclusive protected access to the drive. In the event of a major computer failure, the talent must be able to take the external drive to an alternative location for file transfer.

In various embodiments, a third-party computer 130 acting as a SOUNDTREAK site may provision the audio/video recording management software 108 to the producer and talent over the network 100, and may charge one or both parties for use of the software 108, based for example, on a total time of the recording session. The third-party computer 130 may, alternatively or in addition thereto, charge one or both of the producers and the talent a membership fee or subscription fee for use of the software 108. In various further embodiments, the third-party computer 130 may also send and receive the data described herein between the producer and talent, or such data may be communicated directly there-between over the Internet or other network, without involvement of the SOUNDSTREAK site.

The following SOUNDSTREAK software components may reside on the SOUNDSTREAK site:

Meeting Coordinator: a component of the SOUNDSTREAK site that works as a SIP Proxy/Server, in order to maintain and look-up user registries and locations. After users start SOUNDSTREAK at their computers and enter their IDs, a "Meeting Agent," as defined in the next section, will deliver user ID and location information, such as Internet Protocol (IP) and listening ports, to this component in order to update location information. This component will accept SIP "Invite" commands, look-up the invited producer location and coordinate the meeting for the Session initialization. Only the session initiations and recording time posting involve communication with SOUNDSTREAK Site. All the other communication may be accomplished directly between the producer and the talent.

In addition to the functionality above, the SOUNDSTREAK site will present a visiting user with five options: (1) logging in as a voice-over artist or talent, (2) logging in as a producer, (3) browsing the talent that are members of the site, (4) touring the SOUNDSTREAK product, and (5) registering the user.

New users who register as producers will be asked to enter their e-mail address, create an alphanumeric password, and confirm such password. SOUNDSTREAK will check the entered e-mail address against a database of registered users. All SOUNDSTREAK user ID's must be unique. If the user and password already exist, the person will be transferred to the "logged-in" interface, the assumption being anyone who knows the exact email and password of a user is, in fact, the user. Once a producer has selected an email and password, he or she will be taken to a "user information" page as a next step in the registration process. New producers may be asked for the following information: name, title, company, and contact information. This data will be stored in the SOUNDSTREAK user database in appropriate fields under the type "Producer."

After a producer has registered, they will click a "Producer Login" button. The login may be, for example, the user's email address. The landing page will be the default Session Setup web page, with top navigation links providing access to other areas of the site.

When new voice-over talent wishes to register, they will be asked to enter their e-mail address, create an alphanumeric password, and confirm such password. SOUND-STREAK will check the entered e-mail address against its database of registered users. All SOUND STREAK user IDs must be unique. If the user and password already exist, the person will be transferred to a "voice-over logged-in" interface, the assumption being anyone who knows the exact email and password of a user is, in fact, the registered user.

Once the talent has selected an e-mail and password, he or she will be taken to the user information page as a next step in the registration process. All registering talent may be asked for the following information: name, company, contact information, gender, agent information, voice attributes, voice samples, and external affiliated websites (if any). A talent who registers will generally be available under search, browsing and shopping cart functions described herein, unless they otherwise specify their availability via these functions. In such cases, a separate invitation/approval mechanism may be implemented to allow only approved producers access to certain talent information.

In order to accommodate the talent browsing functions described above, talent are encouraged to store various attributes and information about themselves which may be reviewed by producers seeking talent for a particular production. Accordingly, the talent may store any of the following:

(i) Voice Attributes. Artists use a variety of classifications for describing their voices, for example, "Hard Sell," "Soft Sell," "Accents," "Cartoon," and the like. An exhaustive list is not provided here. Talent will have the option of classifying themselves for as many attributes as are applicable. In addition, a text-field with additional comments will be provided for further description.

(ii) Voice samples. Talent will have the option of uploading a number of audio clips of themselves. There may be a cap on length and file size, as determined by SOUND-STREAK's infrastructure limitations.

(iii) Websites. Talent can list his or her website, which in turn, may be hosted by the SOUNDSTREAK site for a fee.

(iv) Availability. Talent may provide an indication of their availability for producers and talent, or their agents, must maintain and update this information over time.

Talent will also be allowed the opportunity to identify their agent or representative. For purposes of entering agent information, a talent may be presented with a drop-down or pop-up window containing agents SOUNDSTREAK has already registered. If an existing agent is selected, then in all public-access cases (browsing, shopping cart, etc) the agent's contact information will be presented. For Session set-up, both the talent and the agent contact information will be presented, since scheduling can require contacting both the agent and the talent.

Existing agent data will not generally be entered or editable by the talent. SOUNDSTREAK may instead input such data from an agent itself, or from a national directory that includes the correct information. If the talent artist doesn't see his or her agent, a "submit agent" option will be available. This information should not directly go into the website database. It will instead be sent to SOUND-STREAK for verification. If a talent has no agent, then the talent's contact information will be entered for purposes of scheduling and billing.

After a talent has registered, they will click a "Voice-over Artist Login" button. The log-in ID may be the user's email address. The landing page will be the artist's profile web page, with top navigation links providing access to other areas of the site. Talent will be responsible for assuring that their home studios are equipped with well-functioning professional grade microphones, sound dampening, and all necessary signal processing equipment.

After registration, any authorized SOUNDSTREAK user will have the option of looking through a directory of talent. Browsing will include alphabetical listings, browsing by announcer type, browsing by agent, and a more robust search using keywords, Boolean flags for union membership, talent location and talent voice-type. Once sufficient traffic is established on SOUNDSTREAK, talent ratings (as determined from feedback from producers in prior sessions) may be provided to help establish user confidence in soliciting new talent.

Talent listings can range in complexity and richness. Talent listings may include the following exemplary fields of information pertaining to each listed talent: ID Number (auto-generated), name, location, agent, gender, union membership (i.e., Screen Actors Guild (SAG) and/or American Federation of Television and Radio Artists (AFTRA)), contact information, voice types, voice sample, talent web pages (either SOUNDSTREAK-hosted, or external), SOUND-STREAK-specific agency web pages, talent rating, and current availability. Since listing presentations may also be a revenue opportunity for operators of SOUNDSTREAK, the quantity and style of presentation for a particular talent may depend on the fees paid by a talent for the listing, or the like.

After registering, a producer can immediately be given the option to start using SOUNDSTREAK, whereas talent may not generally be taken to such Session Set-Up page upon completing registration. The session set-up page generally will be the same interface for all users setting up a session.

The first screen to launch for Session Set-up may be Billing. Therein, producers can choose between invoicing a SOUNDSTREAK-approved customer, paying by credit card or other financial instrument, or exercising a SOUND STREAK promotional offer. The producer will have the ability to store several credit cards with SOUNDSTREAK, all of which will be presented as payment options, with suitable radio buttons for selecting desired options. The user will also have the ability to add a new credit card. The details of both invoice billing and credit card billing are detailed immediately below.

Studios, agencies and other contractors of producing services are already in the practice of accepting invoices from sound recording facilities. Replicating this, SOUND-STREAK will set up relationships with such entities and invoice them monthly for all business conducted using SOUNDSTREAK on their behalf. The studios will be responsible for approving a list of users who have the right to use SOUNDSTREAK. If a producer is connected with any approved vendors, such vendors will appear as a drop-down option. There is provided a help link that, upon selection by a user, will launch a pop-up window explaining how a studio sets up Invoicing, with an option to submit a request to SOUNDSTREAK to set the user up with a specific vendor. It will be up to the studio to keep the list of approved producers up-to-date. SOUNDSTREAK will bill the studios with a breakdown of producers, time, and project names, which will facilitate the studios monitoring usage levels.

In order to accommodate payment by credit card, debit card or any other useful payment instrument, SOUND-STREAK will partner with some vendor validation programs, such as VERISIGN, EMETA or others, to increase customer comfort about inputting credit card information. Such entered information may include the following: payment or credit card type, card number, expiration date, billing address, name, and phone number. Such information will be validated prior to charging the payment instrument in any of a variety of well-known manners.

When making payments, producers may have the option of entering a promotional code, that may, for example, credit the user with a fixed number of connectivity minutes, and which may be used over one or more sessions.

After suitable payment means have been authorized and verified according to agreed pricing and in conjunction with any promotional codes, the producer will next be asked to enter session information. Sessions will require a Project Name, a Session Name, an identification of the producer, and an identification of the talent. Additionally, another user or users can be specified to participate in the session as "observers" if desired. Observers may participate in a session by use of a computer device connected to the network, as with other session participants. Alternatively, the observer may connect to a session by land-line or cellular telephone. A suitable network address or standard telephone number may be provided for telephonic participants to join a session. A dial-in interface or SIP provisioning may be provided on the data network used by SOUNDSTREAK participants to accommodate dial-in observation of a session. These and other session set-up options will be described in more detail immediately below.

The Project Name may be assigned by the Producer. All Sessions may be grouped under Projects by Project Name in a one-to-many configuration. Prior projects may be selected from a drop-down box. When "New Project" is selected, a small pop-up window will appear where the producer can enter a Project name. For data integrity's sake, if an entered project name is close to that of a previous project, SOUNDSTREAK may prompt the producer regarding the close match to avoid or minimize duplicate or confusingly similar entries. SOUNDSTREAK will allow for entry detailed project information, such as length of time, geographic region, or detailed client information with the Project Name.

The producer may then enter session names for a particular session under a particular project name.

Next, the producer will select a Session Type. There may be, for example, three types of Sessions from which to select, including: auditions, unsupervised recordings and supervised recordings, each of which will be discussed in turn below:

When the session is an audition, the producer will generally wish to associate several talents with a session. When an audition has come in to SOUND STREAK from any of the talent, the producer may be notified, for example, via email. These audition files will remain as part of the Project Name defined during Session Set-up For sessions where no supervision is necessary, the producer may associate a talent to such unsupervised session. Upon completion of set-up, a script will be sent to the designated talent who, in turn, will make a recording using his-or-her program of choice, and then upload the media to the producer. In some embodiments, audio recording software may be provided by SOUNDSTREAK, or offered in partnership with another vendor. As with the Auditions feature above, upon upload of any recorded sessions from a talent, the producer in charge of the session will be notified via email or the like.

For Supervised sessions, the producer may define the session and identify talent, and then, using the SOUNDSTREAK producer component, supervise the recording of a session.

Upon completion of any session definitions above, an email and/or fax of the script will be sent to the identified talent, as described later below.

The default producer for any project or session will be the producer currently logged-in. However, additional or alternate producers may be identified.

As described above, the producer will identify a talent for the session. A drop-down box will be provided during Session Set-up that list all available talent from the SOUNDSTREAK site, and/or those in a producer's Address Book.

A producer will have the option of specifying other clients for the Session. A list of individuals defined as "Clients" in the address book, will be available via drop-down. Fields may be provided for entering other new clients.

Various other session settings may also be provided during Session Set-Up. Some examples include: an option to deliver scripts by facsimile to a talent, an option to electronically generate and submit union member reports or union contracts with AFTRA or SAG, an option to automatically submit session information with an agent of the talent, an option to automatically submit session with an identified client, and an option to load audio or movie files related to the session to or from the SOUND STREAK site. Any party can add an electronic signature to complete a form or document and verify consent to an agreement. SOUNDSTREAK will also act as a SAG/AFTRA signatory and act as an intermediary, so non-signatory companies can record union talent using SOUNDSTREAK to pay the talent. SOUNDSTREAK may also integrate a full service talent payment processing business similar to TALENT PARTNERS, INC.

During Session Set-Up, the producer will be prompted for at least one script. Each script will have a naming box, with an example next to it, such as "Ex. 20 Sec. Spot., Tops & Tails" Below the naming box may be a cut-and-paste interface, and an up-load button. Beneath the cut-and-paste window may be an option to add another script. This will refresh the page and present another name window and cut-and-paste window below the first one. There is no limit to how many scripts can be added.

Once entered, the last step will be a page with all the session information, and the selected billing information, presented for final confirmation. The Producer will be presented with a confirmation page showing all the participants, the billing information, the scripts, and their titles. Each of these options will have "Edit" links next to them, to allow for quick and easy correction. At the end of the confirmation page, the user will either Exit or Confirm.

The SOUNDSTREAK site may pre-authorize the producer's credit card for one hour worth of recording time per session. At the end of the recording session, the pre-authorization will be released and the credit card will be billed the exact amount, Rate (A) x Number of Minutes (B). Alternatively, Producers may be charged a "flat rate" for sessions up to a defined duration, for example 90 minutes. The credit card charge may appear on the producer's statement as "SOUNDSTREAK-[SessionName.Project.Date]" for easy reconciliation. If the charge or preauthorization fails, the user will be prompted to enter a different card.

Confirmation will also trigger the automatic faxing, transmission or other delivery of the script to talent, based on the delivery option selected. This will allow sufficient time for talent to review script before SOUNDSTREAK billing starts.

After a Session has been set-up, it may be commenced according to the producers desired schedule. Recording of a session takes place via a Record interface, which unlike the rest of SOUNDSTREAK, requires a certain amount of desktop-like functionality. Specifically, play buttons, record buttons, timers, script windows, etc. must be locally interactive, and not require a round-trip communication from the user's computer to SOUNDSTREAK's server.

The Record interface includes the following software components:

(i) SOUNDSTREAK Studio. The SOUNDSTREAK Studio will be a virtual environment where producers and talent communicate, record takes, review scripts, transfer files, and virtually sign-off on documentation.

(ii) Version check of the software to confirm it is the latest version available. The user, when going to record a session, will be prompted to download the latest version if SOUNDSTREAK does not detect the appropriate software. Additionally, if product patches, updates or later versions have been released since the user's last download, he or she will be prompted to download the latest software.

(iii) System diagnostic. The integrity of the talent's system is critical to SOUNDSTREAK's performance. SOUNDSTREAK will specify minimum external drive system requirements, such as amount of free memory to be available, for all talent. SOUNDSTREAK will also recommend specific configurations of memory for optimal performance. Over time, however, talent memory storage devices may become cluttered and inefficient. Therefore, a number of diagnostics should be run on the talent's computer prior to each recording session, with results presented to both producer and talent. Messaging and guidance for troubleshooting should be available as well.

Figure 4:
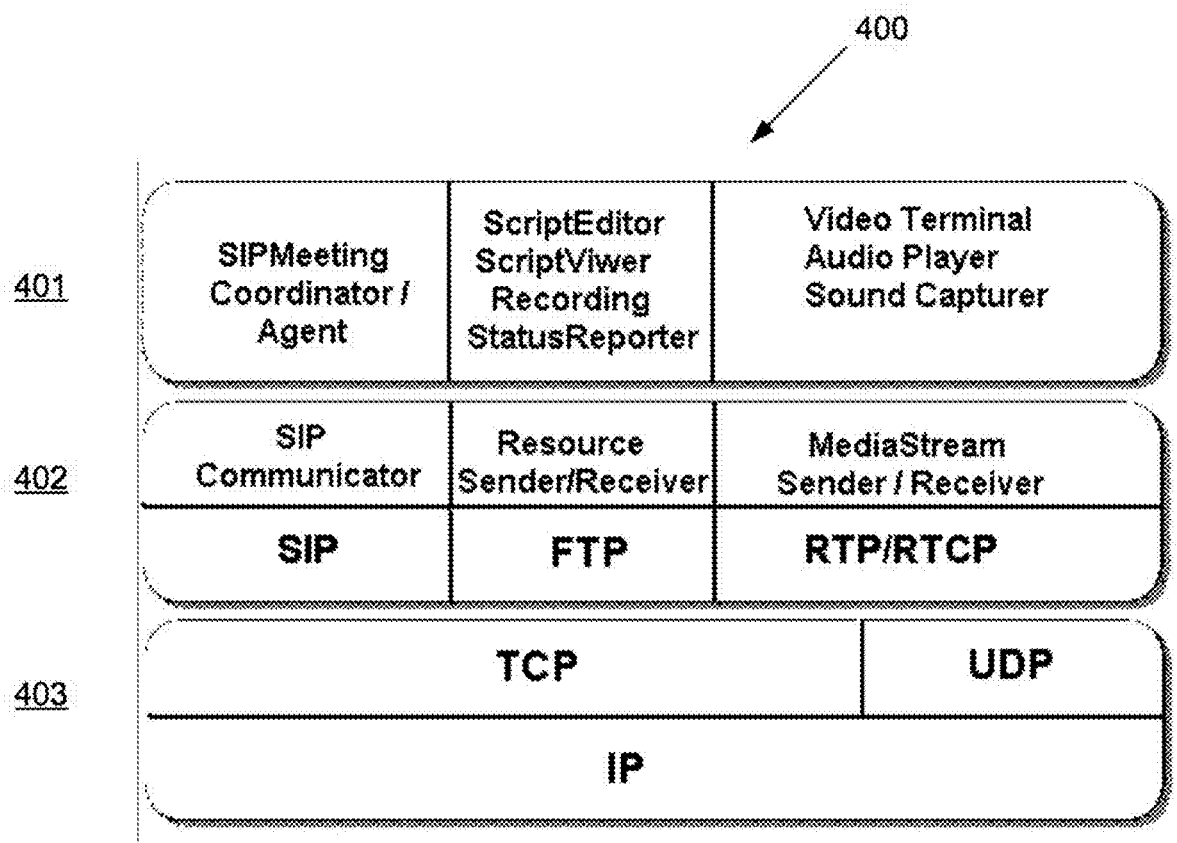
FIG. 4 is an exemplary representation of the architectural layers and components of the software used for the remote recording and management process of FIG. 2.

Turning now to FIG. 2, there is depicted a flowchart of exemplary process 200 for remote voice-over/music production and management that may be performed over the computer network 100 of FIG. 1, in conjunction with the computer architecture depicted in FIG. 4. As used herein, a "total recording session" refers to the plurality of individual "takes" that typically occur in any audio or video production. In various embodiments, the producer and talent may exchange data directly, or through the third party computer 108.

The process 200 commences when the production staff establishes two-way communication with the talent over the computer network 100 (step 202), as described in the foregoing. Alternatively, if a single user is filling all Roles, the session commences when communication is established with the server. At least one high quality data format 120 is established for transferring script data, visual or audiovisual material, recorded takes, 'take sheet' data and comment text, and time index data (used for matching the recorded take to the audiovisual data of the voice-over/music production) for the recording session. Verbal instructions and feedback between the production staff in the talent may be provided in a lower quality data format 122 in order to preserve bandwidth usage, since that information is rarely retained and there is typically no need for high fidelity. Such verbal instruction and comments may be heard and spoken by both parties using a headset, speakers and/or a microphone.

SOUNDSTREAK will run based on the user type, or alternatively on the configuration of roles selected for each user, and present the associated user interface. An external window will show the status, online or not, of people in the user's phone book. Once the target person the user is waiting for is online, the user can contact the person by clicking on the user id/name. Alternatively, session participants can be associated with a session in advance or in real time, and directed to the appropriate session when logging in or already logged into the system. After the Initiation is done, the "Talk Back" button/feature, described in detail later below, will be turned on at the talent end. If the user has paid for the session or is approved for later billing, the "Start" recording button shall be enabled.

Continuing with the process 200, next, at step 204, the script to be read by the talent for the audio/video production is uploaded via the recording management software 108. It should be noted that the script and the corresponding visual or audiovisual presentation may be changed by the production staff or other session participants and uploaded again at any time during the recording session. The script data and accompanying visual or audiovisual presentation may likewise be changed. An exemplary screen display of such uploaded data is provided in FIG. 3, and described in detail later below.

When the talent starts working on a project for the first time, there is no video or script available on their computer. SOUNDSTREAK will push/synchronize the audio-visual file and take/script definitions from the producer to the talent or to all session participants as appropriate. In some embodiments, part or all of the transfer of these materials to participants' machines can be done prior to the session. After the delivery is done, a copy of the files will be stored in the talent's local disk in local files under a project directory. For later access to the same project, no redundant loading will be required unless the video file has been changed or deleted or takes/scripts have been modified. In some embodiments, the audiovisual material and script files may be deleted from the local disk of some or all participants at specified times, either for security reasons or to manage use of storage on the participants' computers. The rules for deleting audiovisual and script files can be defined by default or specified by the participant contributing (uploading) this material. For example, when uploading audio-visual or script material, the participant uploading such material may specify deletion at the end of the session, at a specified date after the session (or next login after that date), or deletion only when triggered manually by the up loader.

Once the audio-visual material has been transferred to session participants, it can be played for session participants prior to initiating the recording of a take. Optionally, scripts can also be displayed in synchronization with playback.

In some embodiments, the Talent is free to use the play controller to play/view the video for preparation. While the talent plays and views the video, the synchronized scripts will be displayed on the Script Viewer.

The process 200 then continues to step 206, where a timer is started for the recording session. The timer serves a variety of purposes including allowing the talent to properly time in his or her recordings in accordance with the script and visual or audiovisual presentation. The timer may also provide time index data for use with editing the record sessions.

The timer may display the total time of the entire recording session, and/or may display the time for an individual take within the recording session. Start and stop buttons may also be provided to participants to allow the timer to be used as a stopwatch.

When the recording process starts after a producer clicks on the "Record" button, Script Viewer will show the script synchronized with the Video Terminal, and before a predefined ahead-time, for example 0.5 seconds or 1 second, the coming script on the Script Viewer shall be highlighted or marked with a clear signal indicator. All session participants will be able to monitor the performance as it is done, and in synchronization with any associated audio-visual material, which will be played locally on their computer.

The recorded sound will be stored at the Talent's computer, with each take recorded as a separate, clearly labeled file, and delivered to session participants for synchronized playback. In some embodiments, the take will be saved in two formats: a high-quality data format suitable for final output and a lower-quality data format optimized for rapid transfer to enable local playback by participants as quickly as possible. In some embodiments, this transfer can be made even faster by recording each take as multiple, individual portions, which can be transferred before the take is completed, reassembled at the receiving end, and compared to the completed low-resolution file at the sending end to validate its integrity. Such comparison can be performed using techniques such as checksum or hash sum algorithms. One such checksum algorithm is a "longitudinal parity check," which breaks the data into "words" with a fixed number n of bits, and then computes the exclusive-or of all those words. The result is appended to the message as an extra word. To check the integrity of a message, the receiver computes the exclusive-or (XOR) of all its words, including the checksum; if the result is not a word with n zeros, the receiver knows a transmission error occurred. Other possible techniques include use of check digits or parity bits, modular sums, position-dependent checksums, and the like. Alternatively or in addition thereto, the real-time audio data can be captured on the computer of each participant, and through the use of synch marks-tones, visual markers or machine readable markers placed in the recording of the real time audio to facilitate synchronization with comparable synch marks in the audio-visual content- can be played back in synchronization with the local audio-visual data from participants' computers.

When these recordings arrive at participants' computers, SOUNDSTREAK will be able to play back the take in synchronization with any audiovisual material used during the recording of the take, and with playback synchronized between all participant computers. This approach of transferring take files for local playback on the computer of each session participant will avoid problems associated with streaming during playback, including jitter and dropout, changing latencies, and differing latencies between users, and will ensure that all participants hear and see the same things at the same time. The approach of using lower-quality data formats for this playback, and/or of transferring these files in sections as described above, ensure that playback on all participant computers using local playback can be begun as quickly as possible after the take is completed.

Session participants can then review each take, discussing it if needed, and decide whether the take should be kept and/or transferred to Recipients. The producer, Engineer or other designated participants are able to enter comments on the Recording Status Panel, which can be rendered visible or not visible to talent.

Returning to the process 200, a detailed 'take sheet' is next created that will list the takes, a total session time, a stopwatch time (if used), any text comments entered by the production staff or talent, and a file transfer status for each take (step 208). This information is displayed within the audio/video recording management software 108, and may be printed out for review by either party. Video, audio, or audiovisual data corresponding to the voice-over/music production may also be provided to the talent in order for the talent to record takes in real time with the running of the audiovisual data (herein "read-to-picture" capability).

At step 210, an individual take of the recording session may be completed by the Talent. Participants may listen to audio takes and view video takes as they progress. Other parties (an agent of any party, a party commissioning the voice-over/music, production editors or the like) may also have access to the live session being recorded, via additional computers that communicate over the network 100. Upon completion, the individual recorded take may then be transferred to production staff for review and approval. The transfer of the recorded take in high or low resolution data format may begin before the voice-over/music session is completed. In some embodiments, the transfer may begin before the take is completed. The audio/video recording management software 108 may show a progress of the transfer as described later below. Takes may also be played back during the session for review by participants prior to transfer of high-resolution recordings.

A take of a recorded session that is deemed worth transferring to Recipients is referred to herein as a "buy take." After an individual take is recorded, the production staff or Engineer may indicate that a take is a buy take using the software 108.

If, at step 212, a buy take is indicated after an individual take is recorded, the process 200 continues to step 214 below. If more takes are wanted, either because a buy take has not been indicated or because other takes desired, the process 200 returns to step 210 above until a buy take is established.

Upon approval of a buy take, the buy take may be uploaded to Recipients using the high quality data format 102 (step 214). The buy take may be uploaded before the end of the recording session. In those embodiments in which a third-party computer 130 provisions the audio/video recording management software 108 to the producer and talent, after a completion of the voice-over/music production, a payment based on the timing of the session may be calculated and then charged to the producer for the session based on the session length and a time-based rate (step 216), after which the process 200 ends.

In various embodiments, the buy takes may also be backed up with the storage of the talent computer 110 or the third party computer 130 as part of the process 200. In other embodiments, selected takes may be deleted from the local disk of the Talent as soon as transfer to a server or to Recipients has been confirmed, or at a specified later date, either for security reasons or to manage use of storage on the Talent's computer. The rules for deleting take files can be defined by default or specified by the participant contributing (uploading) this material. For example, when uploading audio-visual or script material, the participant uploading such material may specify deletion at the end of the session, at a specified date after the session (or next login after that date), or deletion only when triggered manually by the uploader.

Referring now to FIG. 3, there is depicted an exemplary screen display 300 and may be presented to participants by the audio/video recording management software 108. In the case of a standalone application, the display 300 may be provided within a separate application window of a graphical user interface. In a case where the network 100 is the Internet, the display 300 may be presented within a window of an Internet browser or the like. In some embodiments it is envisioned that each participant will be presented with only those user interface elements corresponding to their designated roles.

The display 300 includes presentation of session identification data 302; an area 304 in which a visual and/or audiovisual presentation corresponding to the voice-over/music production may be presented and run, an area 306 in which the text of the voice-over/music script (script data)

may be presented; control buttons 308 for starting and stopping a timer of a take or session, as well as a button for initiating a playback of a selected take or session; a timer display 310 for displaying a current time of the session or take; and an area 312 for displaying take sheet data, including: (1) the take number of each take in the session, (2) a time index of one or more takes including start and stop time based on the timer data, (3) text comments that have been entered for each take, (4) a field for indicating whether the take is acceptable, and (5) or more fields indicating the transfer status of the data file correspondent each take in the session. The control buttons 308 of one session participants computer can, in various embodiments, likewise control or govern the various playback functions on other session participants computers by transfer of such commands to other participants' computer and its SOUNDSTREAK software over the data network. In additional embodiments, the control buttons 308 may be provided for local playback functions only of the session participant using such controls.

The display 300 provides Read-to-Picture capability through the use of, for example, WINDOWS MEDIA PLAYER for presenting the visual and/or audiovisual data within the area 304 that corresponds to the script text displayed in area 306. This allows the talent to view any accompanying audio/video of the voice-over/music production while making a recording of the accompanying voice-over/music, and further allowing the recorded takes to be indexed thereto. The area 304 may provide access to all WINDOWS MEDIA PLAYER functions such as play, pause, stop, rewind, fast-forward, mute and volume controls.

In order to assist talent and reduce the burdens of separate displays of script and corresponding audiovisual data, SOUNDSTREAK may, in various embodiments, offer a special onscreen presentation method referred to as 'Voiceover Karaoke.' A large video player window will be presented on the talent's computer screen. It will have the textual script of the production superimposed over the moving video in the same screen location. This will allow the talent to read while still keeping view of the video images that correspond to the performance. As with the script display, there may be selectable page tabs so the talent can quickly switch to the next superimposed page of text. Alternatively, synchronization of text to the audiovisual data can be managed automatically by SOUNDSTREAK as described below.

Additional similar programs may be used and incorporated within SOUNDSTREAK for presenting audio-visual data. For example, QUICKTIME, the media player developed by APPLE CORP., can play a variety of media formats on WINDOWS and MAC OS. QUICKTIME JAVA is the JAVA application programming interface (API) provided by APPLE to communicate with QUICKTIME for media playing and processing. Network Address Translators (NAT), may also be used for interconnecting private address realms to a global address realm to create an Internet address architecture within the SOUNDSTREAK environment.

When audio-visual material is uploaded during session set-up, a media playing window will show visual content for both the producer and the announcer. All standard playback options governing video, audio or other audiovisual modalities will be available in the media player for the producer, or in some embodiments for the Engineer role. The producer's media player controls the talent's media player. For example, playing, stopping and rewinding on the producer's desktop triggers the same actions on the Talent's desk-top. If no audiovisual media was uploaded during set-up, a producer can locate a local movie file and upload it if desired. The upload process should transfer the audiovisual file to the talent's computer as well.

The talent's interface will be a passive, simplified version of the producer's interface. Accordingly, the talent interface may include the following functions:

(i) Script Window: a window for viewing and editing scripts.
(ii) Tabs: the talent will see the same tabs as the producer. The talent will not be able to edit the tab names or add tabs. They will be able to navigate for the purpose of rehearsing.
(iii) Text window: the talent will view the text window for the tab the producer has selected. For the announcer, this window can be un-editable at the producer's discretion. The talent will, however, be able to increase/decrease text size, and scroll, for easier viewing.
(iv) Session length: the time that the talent has been connected will be displayed on-screen.
(v) Media window: like the text window, the talent watches what the producer watches in this window. This is a passive window with no controls provided to the talent.
(vi) Talk-back mute button: a radio button by which the talent may mute out-going conversation.
(vii) Take Number indicator: this indicator starts at "1," and increments every time the recording process is started and stopped. It is a global number that increments sequentially with each take of a script.
(viii) Take name indicator: this name may be automatically produced by SOUNDSTREAK as, for example, [Script Name].[Take #].
(ix) Project information display: this may include, for example, project name, producer name & contact phone, session name, talent's name and contact information, and date of recording.
(x) Available disk space indicator: this figure, calculated after every take, approximates how much available disk space the announcer has for further recording.
(xi) Auto-slate indicator. When illumined, this indicates that auto-slating has been turned on.
(xii) Auto-time: The auto-record function detects the first spoken sound after the signal, and starts the take time automatically. After the recording is stopped, the system detects the time of the last audible sound above room tone. The time gap between the first audible sound post-signal and the last audible sound pre-termination equals the calculated time. Ideally, this time will display as a running time on the interfaces of producers and talent.
(xiii) Stopwatch time: this is normally blank, and changes only if the producer edits the window or uses the keyboard stopwatch.
(xiv) Transfer progress: this may be a progress bar indicating an approximation of transfer progress based on the size of the file and the amount of data transferred.
(xv) VU meter: this is a decibel meter, color-coded to indicate dangerously high audio levels (green for an acceptable level, yellow for levels approaching an undesirable volume and red for excessive volume). The color calibration may be consistent with VU meters used in other media programs.

The following is a description of all the elements on the producer's screen, which is an enhanced version of the talent interface to accommodate further producer functions:

(i) Script window: similar to the talent interface, the producer will have a window for viewing and editing scripts.

(ii) Tabs: the window will have several tabs across the top, one for each script. These tabs will be named according to the names specified. The last tab will have a "+" symbol, indicating addition of a tab. When clicked, a new tab will appear, automatically named [TabN], N being the sequential number of the latest tab. The producer can click on the tab name and re-name. There is no limit to the number of tabs a producer can specify. If a producer specifies more tabs than are presentable on the screen, a tab at the far right will show arrows, indicating more tabs are visible when clicked. Clicking the arrow tab will reveal a drop-down with the remaining tab names presented. If there are more than two screens worth of tabs, then selecting a tab in the middle range will produce two arrow tabs, one at each end of the script window, indicating further tabs in each direction. When the producer clicks a new tab, the system will ask if the current tab should be updated. If not, all changes will be lost.

(iii) Cut-and-paste window: the tabs will sit atop a large text window. If scripts were specified during session set-up, the text for each script will appear under its tab. If no scripts were specified, or a new tab is added, the window will be blank. Whether the window is blank or not, the producer can interact with the window as though it were a text editing interface -highlighting, adding, deleting, typing, cutting and pasting.

(iv) Update button: at any point, the producer can click the "Update" button and the changes made to the current tab will automatically appear on the talent's window, and any other participant's window.

(v) Session length: displays the time the producer has been connected to the talent. The producer and the talent must both be online in order to record. SOUNDSTREAK time is calculated from the moment both parties are connected to the time one of them logs off.

(vi) User indicator: when the talent is online, an icon next to his or her name will appear.

(vii) Session contact information: The talent's phone number is displayed on-screen, so that the producer can call the announcer in case he or she is late.

(viii) Talk-back button: A button on the screen, and a key on the keyboard, which allow for two-way communication between the producer and the talent. The default state is that the producer can hear everything the talent says, but the talent cannot hear the producer unless Talk-back has been activated. All clients, or participants with the producer-type interface, can always communicate all the time. When two-way communication is enabled, the button should light up or visually indicate that Talkback is activated. If a producer is trying to talk back while the announcer is recording a take, a message will appear to warn the producer. However, the producer is allowed to proceed when interruption is desired. A producer may or may not cause the take to automatically end when Talk-back is activated.

(ix) Record button: the record button triggers the talent's computer to start capturing the audio or video and writing it to the specified memory device or drive thereon. The button should flash red, indicating recording is in process. If auto-slate is activated, then this should also activate the automatic verbal slating of take, and the beep signal, which is recorded as part of the audio file. Whatever caching/reserving process in place must be triggered each time record is pressed. The recording time will be accumulated. The summarized usage information will appear on Recording Status Panel and be delivered back to SOUNDSTREAK site for billing information. Once the usage exceeds the available recording time plus allowed over-time, the recording function will be stopped by disabling the "Start" recording button and a warning message will appear. This service interruption shall be delayed until a take is finished.

(x) Stop button: this stops the talent's computer from recording audio files. This action should increment the take number, increment the take listing interface, and trigger the auto timer (if selected) to read the audio file, calculate the take time, and present it on-screen in its appropriate place.

(xi) Take Number: This starts at "1," and automatically increments every time the recording process is started and stopped.

(xii) Take name: this, by default, may be automatically calculated as [Script Name].[Take #] where Script Name comes from the name of the tab for the active script window and Take #is the active take.

(xiii) Project information display: this may include, for example, project name, producer name and contact phone, session name, talent's name and contact information, and date of recording. All printing (for this and other functions) will be handled by the web browser's functionality, with printing results that conform to the primary information presented on-screen.

(xiv) Auto-slate indicator. When illumined, this indicates that auto-slating has been turned on. The producer and the talent should know that no verbal slating of the take is necessary, and that verbal slating will interfere with the auto-timing functionality. When on, the system verbally slates the take with the appropriate number, and generates a distinct signal. If this function is turned off, a warning appears telling the producer that auto-timing will be disabled, and asking for confirmation.

(xv) Auto-time. The auto-record function detects the first spoken sound after the signal, and starts the take time. After the recording is stopped, the system detects the time of the last audible sound above white noise. The time gap between the first audible sound post-signal and the last audible sound pre-termination equals the calculated time. Ideally, this time will display as a running time on the interfaces of the users.

(xvi) Stopwatch time. The producer will also have the option of using the keyboard as a stopwatch. A single keystroke will start the timer, and that same key struck again will start the timer. This field will be editable, in case the producer users a physical stopwatch to calculate time. The producer will be advised to use the stopwatch functionality (either keyboard or manual) to verify automatic timing.

(xvii) Comments field. The producer can input comments about a take directly in the take window. Comments will not normally be displayed to the talent.

(xviii) Good/No Good radio buttons. Producers are used to indicating whether takes are Good or No Good. A radio button marking a take as good will be adequate. This action does nothing besides annotate the take in the SOUNDSTREAK system. While it is legacy from analog editing, it persists in all digital editing systems, and is appropriate to provide in SOUNDSTREAK.

(xix) Transfer radio buttons. This button will trigger the transfer process, via secure FTP, from the talent's computer to SOUNDSTREAK's server or the producer's computer. This should start immediately in the background, and not interfere with ongoing recordings.

(xx) Transfer progress. This will be a progress bar, an approximation of transfer progress based on the size of the file and the amount of data transferred. This indicator is important, but should not interfere with higher priority functions, like timing, recording, or script updating.

(xxi) VU meter. This is a decibel meter, color-coded to indicate dangerously high audio levels. The color calibration should be consistent with VU meters used in other media programs, as described previously.

(xxii) File transfer button. The files recorded must be transferred to either SOUNDSTREAK's servers or the producer's computer. The "End Session" button will be inactive until all transferring files are complete. From there, the producer can download the clips at his or her leisure to the producer's computer. Once the files are transferred, the program will erase them from the talent's computer. This will ensure smooth recording experiences for all SOUNDSTREAK producers, and it will protect the producer's assets, since the producer technically owns the recordings. In some embodiments, SOUNDSTREAK may allow archival copies of any recordings, script information, and other related documentation to be stored on any of the producer's computer, the talent's computer or at a SOUNDSTREAK site.

(xxiii) End Session button. The producer will have a button labeled "End Session" in order to indicate when a session is finished. The selection of the End Session button will trigger several functions including saving the entire session, which may be viewed thereafter using a View History function. Clicking the "End Session" button will also launch a Session confirmation page. The producer will fill out the appropriate information and click a button on the page labeled "Producer Signature." The form will then appear in the announcer window for the announcer to review. If the announcer is satisfied, he or she will click the button labeled "Talent Signature." The window will close, and generate session records, including emails or facsimiles regarding the completion of the session to the talent's agent and/or union, when appropriate.

All related materials for a project will be stored in a project folder that may be of the following exemplary structure:
project-folder-name [folder]
video-file
take- and script-definition-file
pending-to-be-post-for-file
working-log-file
  take 1 [folder]
    working-audio-file (will become final-audio-file, if accepted)
    unaccepted-audio-file-01 (optionally stored)
    unaccepted-audio-file-02
  take2 [folder]

Within this structure, the following files shall store the following types of information:
video-file (backing-asset-file): stores the video content.
take-and-script-definition-file: stores the media time definitions for each take and the
associated script content.
pending-to-be-post-file: only exists if posting recording time failed. This file will be used to do store-and-forward. For integrity, meaning avoid manual manipulations, the system may store posted data in a file and recording time information in each take folder in encrypted format for consistency checks.
working-log-file: stores all relevant information for the recording process. This file
may help resolving disagreement with time consumption or system trouble shooting. working-take-file: stores the current recording audio or video file (in appropriate format, such as WAV). Once the recording is done and acceptable, the file will be renamed to the final audio/video-file.
unaccepted-audio/video-file-01: The system may provide user with options to store
unacceptable recorded file for comparisons. The maximum number and size can be defined for constraints.

In various embodiments, SOUNDSTREAK may generate two general types of reports, internal and external. Internal reports are generally provided for trouble-shooting, usage patterns, customer analysis and feature de-bugging. External reports are those to be generated for users and their customers for purposes of auditing, billing, business management and the like. At a high level, there are three steps to producing reports: generating the information, storing the information, and presenting the information. It is up to the source code to generate the information. Retrieval and presentation can be done through data warehousing, web-generated reports, automatic background programs, and any of a variety of manners readily known to one of ordinary skill in the art.

In various embodiments, SOUNDSTREAK shall generate error messaging when any steps in the SOUNDSTREAK process fail. The error messaging should serve two functions.

First, error messaging should allow the user, regardless of technical competence, to serve as a first line of defense to address simple errors. This will lower technical support costs, and increase customer satisfaction. Pop-up messages may be provided for simple errors with plain language explanation of errors and usual manners of correcting the same. Such error messaging may include:

(i) Connection errors. Recording sessions are generally costly, and connectivity must be addressed immediately. When two users fail to connect because of firewall issues, proxy settings, unavailable ports, or the like, the system must present the information to the users, with actionable steps to rectify such errors immediately.

(ii) Recording readiness and recording errors. A successful recording involves signal capture and writing to disk. Depending on the capabilities of a talent's computer, doing both simultaneously could tax their system. While writing-to-disk can experience temporary delays with some level of acceptability, capture must never be interrupted. However, since no process is completely uninterruptible, SOUNDSTREAK must be aware of any inadvertent system suspension and be able to analyze the same. Whenever a recording has been adversely affected, for example, by detecting drop-off in recorded sound levels and the like, SOUND-STREAK must generate messaging immediately, so as to avoid the possibility that a producer discovers after the session is completed that a capture error unexpectedly rendered the session incomplete or of inadequate quality.

(iii) Transfer errors. SOUNDSTREAK may also detect and manage incomplete or interrupted transfers. From a reporting standpoint, all that is generally required is that the report communicates issues clearly and immediately to the users, so that they may attempt the transfer again while they are connected during a session.

Secondly, when the error is of a complexity that cannot be resolved by a user, the messaging must be specific enough to allow technical support to address and correct the issue quickly. Failure to load, site crashes, and the like should be logged in the form of internal reports for technical support personnel. In addition, tracking when users abandon the registration and sound recording processes is critical for product management and increasing the level of service provided. Since SOUNDSTREAK's revenue is tied to usage, rather than just an initial purchase, refinement of the user experience will directly correlate to increased revenue.

In addition to the internal reporting described above, SOUNDSTREAK may, in various embodiments, generate external reports that may be of the following types:

(i) Session summary. The users will be presented with a summary page of the Session after confirmation. The page will be the landing page for all future references to the Session. Information in the Session Summary is as follows, and may include hyperlinks to related information where indicated: date, session length, project name (hyper-linked to Project Summary page), session name, producer name and contact info (hyper-linked to Address Book), talent name and contact information (hyper-linked to Address Book), client name and contact information (hyper-linked to Address Book), script(s) with titles, transferred takes (with hyperlinks to detailed take information, when applicable), forms (hyperlinked to documents, such as union notifications, billing invoices, and the like). All of this information should be generated in such a way that, when a data warehousing system or the like is implemented, appropriate fields will be populated in a database having suitable formats and data types.

(ii) Project Summary. To the user, SOUNDSTREAK operates around the Session. But over time, users may wish to become "project-centric," with individual sessions aggregated under projects. This mimics the actual work experience of producers, who work on a project for a client. Even if the event is a short-term event, like a movie promotion or a sporting event, the media necessary to support the event will exceed what is captured in a single session. If the producer references an existing project for a new session, the project identification must remain the same from old session to new session.

(iii) Client Summary. Producers may use SOUNDSTREAK to manage their clients (studios, advertising agencies, and the like), as well as talent. Accordingly, SOUND STREAK may provide reports that summarize activity on a client-by-client basis.

(iv) User Summary. Since a producer often has multiple clients, he or she will need to see activity across all users with which a producer has interacted.

Similar functionality may be provided for other types of users.

Since SOUNDSTREAK will be both a public-facing internet presence and an ASP web application, interfaces and functionality will change for users who are new or otherwise unregistered. Unregistered visitors will have access to the normal SOUNDSTREAK site, which may provide such users with a company overview, executive profiles and a description of SOUNDSTREAK services. They will also have access to limited functionality, designed to entice registration and demonstrate usefulness while protecting sensitive information, or that designated for registered users or allowed contacts only.

Underlying all the functionality described above, data security is also an important consideration, since SOUNDSTREAK utilizes sensitive information, such as credit card and personal contact information. In addition to developing security appropriate for SOUNDSTREAK transactions, a monitoring and reporting system should be in place to protect against attempted security breaches. All security in the SOUNDSTREAK environment should conform to best computer and network security practices now practiced and as developed in the future. SOUNDSTREAK will implement a site-wide level of security appropriate for credit card storage, personal data storage, and asset (audio file integrity) protection. SOUNDSTREAK will automatically log out users if they are idle for longer than a set amount of time (for example, ten minutes). Users will have the option of having their local computers "remember" log-in names.

In order to use SOUNDSTREAK services, producers will have to be approved prior to their first session for purposes of invoicing them for services used. If any user enters a request for services under the name of a SOUND STREAK client for which he or she is not approved, an email window with a pre-populated request will pop up with a request for information from the user. The user will submit the requested information, which SOUNDSTREAK will forward on to the appropriate client's IT contact. SOUNDSTREAK will follow up with the client to speed resolution. Upon receiving confirmation, SOUNDSTREAK will notify the user that he or she is approved. SOUNDSTREAK will also institute a policy whereby the client is expected to provide notification when a user is no longer authorized to bill them. SOUNDSTREAK will invoice the client monthly, with a breakdown of users, billing times, and projects. It is assumed that the client's accounting system will catch any users that the client had failed to remove from the authorized list.

Alternatively, "pay as you go" pricing may be implemented. For example, users may be allowed to buy "tokens" representing minutes or sessions, which, in association with a password or other credential, allow them to "spend" the credits they have purchased.

Finally with respect to security, there will be inherent peer-to-peer security risks, which can be addressed in known manners corresponding to the method of file transfer and synchronized application control that SOUNDSTREAK implements.

While in the foregoing, SOUNDSTREAK functionality has been described from the perspective of its various contemplated users, the remaining description is dedicated to the implementation of a SOUNDSTREAK server, such as the server 130 described previously with respect to FIG. 1.

Implementation of a SOUNDSTREAK server may, in various embodiments, include the following software: JAVA Virtual Machine (VM), JAVA MEDIA FRAMEWORK, WINDOWS PERFORMANCE PACK, .NET by MICORSOFT, reference implementation software by SUN and IBM for WINDOWS OS, and QUICKTIME with QUICK TIME JAVA installed. Other miscellaneous supports, such as FTP handling and extensible mark-up language (XML) parsing are available according to designer choice.

Implementation of the SOUNDSTREAK server involves many challenges, such as real-time media processing, streaming and VoIP, and the present specification is intended to provide the best, presently-available solutions to cope with related issues. Some of the solution choices may be changed for system enhancement during the implementation stage or as software and hardware functionality advances in the future.

The system assumes users have the following required equipment and environments:
  (i) High-Quality audio recording devices such as microphones and preamplifiers, for example, supporting at least 48 kilohertz (kHz) or close to the sample rate for audio capturing.
  (ii) Broad-band Internet connections directly connected to the Internet. The design does preserve room to deal with connections sharing by NAT and/or behind Firewalls.
  (iii) Computers with minimum central processing unit (CPU) speed, memory size and disk space requirements.
  (iv) Image and/or video capture devices, such as digital cameras and digital video recorders The functional goal is to provide producers and talent, whose systems meet these requirements, with a convenient solution to work at distributed locations while still maintaining high recording quality and productivity. To achieve this goal, the recorded audio shall be stored in high quality digital formats. However, in order to minimize the latency of voice communications, any communications that are not a recorded part of a session may be transmitted in lower quality, real-time formats. As previously mentioned, a third, lower-quality data format may be used to allow rapid transfer of recorded takes from Talent to other session participants for local playback on these participants' computers.

In order to implement SOUNDSTREAK on as many OS types as possible, JAVA may be chosen as the development language, although other implementations, such as .NET, are readily contemplated. Within the JAVA environment, however, JAVA SWING presently provides the richest set of JAVA graphical user interface (GUI) solutions, which may be used to layout the presentation and handle user interactions.

JMF defines a generic and flexible platform audio and video processing and streaming support, especially for its "DataSource" and "Processor" building blocks as well as the plug-in capability. However, the "Reference Implementations" provided by SUN MICROSYSTEMS and IBM are weak with respect to supporting video formats in the MAC OS environments.

APPLE QUICKTIME seems to complement the weakness, but it cannot be the total solution for this issue because it does not have RTP streaming functions for WINDOWS, and its audio-capturing function seems to suffer the possibility of causing disk-full problems on WINDOWS systems in some circumstances.

One solution for this issue is to use QUICKTIME to play video and audio, while utilizing JMF to handle streaming and remaining miscellaneous processes. The two components will be bridged together by developing a JMF "DataSource" implemented by QUICKTIME JAVA Objects, such as "Movie" and "DataRef."

The complexity of supporting various media formats and multiple OS environments cannot be entirely resolved by a single static solution. Therefore a dynamic Implementation Factory design, will be used to cope with this issue. For example, for Video Processing:
  Video Terminal terminal=ImplementationFactory.getVideoTerminal( . . . )

For this implementation, Implementation Factory will always return QTVideoTermal which implements the VideoTerminal Interface by MOVIEPLAYER and related classes in QUICKTIME JAVA. The VideoTerminal is an Interface defined with required capabilities such as: play( ) stop( ) changePlayRate( . . . ), addMediaChangeListener( . . . ), notifyMediaChanges(Rate, Time . . . ).

The complete system may use the VideoTerminal type instead of QTVideoTerminal Type or any other implementation type. The Implementation Factory will make decision based on OS, or even Video Format to return the right VideoTerminal Implementation. This will dramatically increase the system flexibility and avoid the overhaul of the prototype before production use. The flexibility will enable, FLASH VIDEO TERMINAL, or REAL VIDEO TERMINAL, which may be better in some situations. They can be implemented independently and their associated logics can be added in the Implementation Factory without impacting the whole system.

The same solution will be used in other media processing, streaming and dynamic communication mechanisms such as:
  SoundCapturer =ImplementationFactory.getSoundCapturer( . . . )
  MediaStreamSender =ImplementationFactory.getMediaStreamSender( . . . ) For such implementations, Implementation Factory will always return the JMF SoundCapturer and JMF SteamSender. In some implementations, .NET components may also be used.

Media synchronization methods for media involve synchronizing video, audio and associated scripts for different scenarios. In-Media Synchronization will be the first choice, but for some cases it may be not be suitable, and therefore External Synchronization, which requires additional programming efforts, shall be used instead when appropriate.

For In-Media Synchronization, different types of media, such as video and audio, either exist on different tracks of the same file or can be played as an external source, like another in-media track. In this case, the media player will do the synchronization itself based on the media time of each track. A suitable implementation case here would be when the sound has been recorded for a take and its audio file has been delivered to the producer for review. The audio file can then be defined as an external track for the corresponding video. If an external audio track can not be defined for some reason, the video and audio can be merged or multiplexed into another file.

For External Synchronization, this refers to launching multiple threads, each of which controls the playing of a media type. The starting time for all media types shall be strictly synchronized and each thread will play independently based on the associated media types. A primary active media type/thread shall be defined in each scenario and control or notify other threads of time-jump or play-rate changes. For example, users may use the play controller to change the position or rate of video playing. A suitable implementation case is displaying scripts for recording. In this case, the Video Terminal will assume the primary thread and notify the Script Viewer or "Voiceover Karaoke" system of time or play rate changes.

Even though QUICKTIME supports in-media synchronizations for video, audio, and text, the implementation is limited to APPLE movie file formats. Therefore, external synchronization is generally a more suitable mechanism for script displaying.

Another suitable implementation would be playing video in real-time at the producer's computer while talent is doing recording. In this case, the streamed audio handler will assume the primary thread while the Video Terminal shall assume the secondary (passive) thread. This is designed to handle cases like jitter or communication discontinuation, either temporary or permanent. QUICKTIME supports playing tracks from a remote source, and the above case might be implemented by In-Media Synchronization.

"Video Player" and "Audio Player" functions shall implement a transparent media resource swing, which will allow other components to use them, whether the resources are stored at the local disk or are streaming from remote locations. For example, when talent is recording, the audio data may be streamed over the network. After the recording is done, the high quality audio data can then be transmitted to the producer's computer. In either case, the components shall act indifferently for this, either playing remote data or the local audio file, except the output audio quality will be better for the latter case.

For video, when talent first previews the video, the video is streaming over the network. After the process is done, the video will exist as a file on the talent's computer. In either case, the video playing shall be the same, except that the former case may show jittering when the network condition is not good.

In addition to media handling, various modules are provided to handle authentication, communication, user interface (UI) and support functions. An SIP Authentication and Coordination module may use hyper-text transfer protocol (HTTP) authentication to perform login validations, which is readily accommodated by SIP. HTTP may be replaced with secured HTTP (HTTPS) for encryption. SIP is preferable to other protocols, such as H.323, because of SIP's simplicity and plan text formats, which are typically easier for implementation and problem tracing. The SIP Client here will only do initial coordination for the recording, instead of handling complex phone services. An SIP Proxy Server operating in conjunction with the SOUNDSTREAK site may be provided to handle SIP INVITEs from participants, look-up user functions, updates and query location information.

Another possible implementation of VoiP connectivity may use a licensed third party 'softphone' module such as X-PRO or IBEAM from XTEN, Inc. or a similar product that can be integrated into SOUNDSTREAK. A third approach to VoiP functionality would involve bundling a full service VoiP solution such as VONAGE or NET2PHONE with the SOUNDSTREAK system and designing an interface by which SOUNDSTREAK can control the provider's software.

A Communication Handling module separates Sender and Receiver types, which may be additionally classified as either streaming or non-streaming. The former refers to RTP protocol handling. The Sender performs active jobs such as initiating connections or pushing data to the Receiver. The Receiver shall passively listen to a port for delivery or requests. For self-containing purposes, a Receiver shall automatically start listening when it's created without other method calls. It is also recommended that senders and receivers request through, or register with, CommunicationHandler for port and protocol information. The Senders and Receivers also periodically notify the CommunicationHandler of handshaking status. Streaming Sender and Receiver communications shall have a flag to denote whether or not it requires guaranteed delivery (i.e., delivered by TCP or UDP.)

A User Interface (UI) Components module manages display presentations and event handlings. All components shall be prepared for lengthy blocking while calling methods in other modules, especially for network related requests. Predefined timeout values shall be used to ensure that no screen-freezing will last more than the timeout. UI components shall not freeze other components while waiting for processing results. For some cases, a watch thread or an independent process thread may be used.

A Supporting Module defines support classes such as EnvironmentTeller and ImplementationFactory, which shall return objects with predefined implementation classes or some static information. Other supporting classes include ResourceOrganizer and RecordingStatusReporter. The ResourceOrganizer shall understand the project folder structure and help other components to locate or save resources, such as recorded audio files. It may implement a custom "File Chooser" to help producers and talent review the material. RecordingStatusReport will report time consumption to the producer and SOUNDSTREAK. XML may be used for messages for posting, but other suitable formats may also be used.

All the JAVA code will be packaged under the main package "SOUNDSTREAK." All supporting files shall be generating according to a naming convention referencing the file type so as to avoid file name conflicts. Various JAVA packages will be provided including respective classes and interfaces, which may in turn be grouped into sub-packages. Events may be those defined in JMF and may include custom events as a matter of design choice.

The sound for recording may be recorded and saved as .WAV files with a sample rate of at least 48 kHz and bit depth 16 (as with high definition television standards). If the capturing hardware does not support 48 kHz, the sample rate will be degraded by the following order until a supported rate is found: 44.1, 32, 22.254, 22.05, 16, 11.127, 11.025 and 8 kHz.

Users shall be allowed to select a different preferred sample rate even it's not the best one. If the capturing can't support 44.1 kHz or higher, a warning message shall be presented to users for audio quality problems and will recommend that users upgrade their capturing hardware. In order for fast delivery and in order to minimize the latency for audio transmission, 8-bit mono with an 8 kHz sample rate will be used for either talk back or real-time recording transmission, so as to provide reliable, yet lower quality delivery.

There are many kinds of video formats and codecs available, each of which may have some variations. The chosen video playing and streaming solutions, QUICKTIME and JMF respectively, are capable of handling many popular video formats. The following formats and codecs can also be supported for video: AVI (Audio Video Interleave by MICROSOFT); MOV (QUICK TIME Movie File Extension by APPLE); MPEG (all versions of this standard by the Motion Picture Experts Group); CINEPACK; and SORENSON (VIDEO 3).

The SOUNDSTREAK site and producer/talent components are tasked with handling messaging between various users. SIP invitations and responses are used to initiate a meeting session and exchange locations, ports and any other recording-related information between users, and may be of the format shown in FIG. 5. Take/script definition messages, which may be of the format shown in FIG. 6, can be delivered from producers to talent in order to define/synchronize the take definition and script contents. Recording time posting messages may be delivered from talent computers to SOUNDSTREAK Site for verification and payment purposes, and may be of the exemplary format shown in FIG. 7.

SOUNDSTREAK services may be provided to producers and talent as a standalone application or as a third party service on the Internet. In the latter case, access to SOUNDSTREAK functions may be charged to either party on a minutes-used basis, as telephone companies often do, where the minutes used may be determined from the timing functions described above. Additionally, a monthly (or other interval) subscription of the production staff, talent, or both may be required in order to gain access to the online service. Payments for access may be accomplished using any of variety of known on-line transaction processes. Payments due between the production staff and the talent may also be determined from the timing functions described above, as will be readily appreciated from a review of the disclosure provided above.

SOUNDSTREAK can be used beneficially in the radio and television industries (for production of commercials, advertisements, Public Service Announcements, and entertainment programs), in the film industry (for movie production and dubbing), for corporate sales and training (in the production of training seminars and the like), by Internet service providers (for the production of Web based advertisements), as well as software games makers for producing video games run to be run on personal computers or other gaming platforms. Other uses of SOUNDSTREAK will be readily appreciated from a review of the disclosure provided above.

While the descriptions above have been provided with respect to a JAVA-based implementation, it is readily contemplated that other development languages and environments may readily be adapted for implementation of SOUNDSTREAK functions, such as MICROSOFT's .NET.

While the low-quality data format referenced above is described as an audio channel, other forms of low-quality communication are easily accommodated by SOUNDSTREAK's architecture and workflows. For example, the ability to converse by means of text chat is easily added to SOUNDSTREAK. Similarly, video chat technology is easily incorporated into the application, allowing users to see as well as hear each other. As with the audio-only communication described above, these alternate forms of communication can be implemented so as to ensure they are not included in the high-quality format.

Similarly, the SOUNDSTREAK architecture can easily accommodate the capture of high-quality video in place of or in addition to high-quality audio. In one such embodiment, talent performances can be captured using a high definition (HD) webcam or mobile device (smartphone, portable computer and the like) and transmitted to participants in a low-quality data format to facilitate real-time monitoring and feedback. Using methods described above, participants can then designate a take or portion of a take for transfer to a specified recipient in high-quality data format.

In one such embodiment, an HD webcam is used to conduct a videoconference. The video signal in each direction is simultaneously transferred as a low-quality signal that allows "real-time" monitoring or communication and stored as high-quality data format locally (at the location of the camera). During or after the recording, the high-quality format data for one or both participants is transferred asynchronously. In another embodiment, one user can monitor low-quality format video from a remote location in real-time. Some or all footage can be selected and queued for transfer while the recording is in process or at a later time. Optionally, edits can be applied in real time to the low-quality recording as a non-destructive edit list and later applied to the high-quality recording when it has been transferred.

In some embodiments, SOUNDSTREAK supports separate and simultaneous recording of two or more talent participants. The resulting high-quality formats files can then be delivered to a designated recipient individually or after being combined. A sync method such as that described herein can be used to align both high-quality and low-quality data files captured during two or more simultaneous performances. Such embodiments are useful for recording conversations between two or more participants, for instance a news interview where the interviewer and their subject are in different locations. It can also be used to allow actors, for instance those voicing animation, to perform together from remote locations without compromising the experience of performing collaboratively.

In multiple-talent embodiments, it is desirable to employ a sync method in the audio and video files that are captured, so that low-quality and high-quality format files containing the same performance can be aligned with each other and with backing assets used during the take. Such sync methods may include one or more of: time coding, distance from a head-of-file mark, a time stamp using Network Time Protocol (NTP), a delay-adjusted signal sent a server, jam techniques or comparable processes as are known and used in the art. See, e.g., AVID PROTOOLS software or U.S. Patent Appl. Ser. No. 2003/0164084 to Redmann et al.

A sync method can also be used to compile non-destructive edit lists that allow users to apply edits or comments to low-quality format files and subsequently transfer these to high-quality format files of the same performance. Alternatively, when two or more performances have been captured simultaneously edits made on one performer's take can be applied to the corresponding take of another performer. Such embodiments allow users to make edits to a low-quality file before the high-quality file has been transferred or to edit two or more simultaneous performances when only one performer's takes are available.

Once a sync method is thus applied to take files it can be used to selectively transfer portions of a recording. For instance, one or more participants can do long "takes" captured as an uninterrupted recording lasting, for example, an hour. One of the recipients of the low-quality data can select those portions of the take that are needed and prioritize these segments for immediate transfer, leaving the remaining segments to be transferred later or, optionally, not at all. In some embodiments this is accomplished by saving portions of the continued take as shorter, self-contained audio files that can be transferred individually and reassembled or stored separately on participant computers. This approach can be used to designate portions of long "takes" for transfer in high-quality format while the take is still in progress.

Some anticipated use cases for SOUNDSTREAK require an "observer role." This configuration is useful when it is desirable to add a session participant who is neither Talent nor Production, but who wishes to participate in the session passively and/or communicate with session participants by means of the low quality data format connection. Optionally, such "observers" can also see and hear both backing assets and recorded take files in the same format as both Talent and Production. Such participants might include a director in a different location than production, a "client" (for example the product manager for whom a television commercial is being produced), and so on.

In the case of an "observer session" the observer will have access to client software that works substantially like that of the Talent role, but without recording capabilities enabled. Thus the observer would be able to see and hear exactly what other session participants would—backing assets, count-ins, and playback at appropriate resolution. Optionally, observers might have access to the voice-patch or low quality format communication.

In another embodiment of an "observer session," the observer may monitor the session using only audio. This can be accomplished by providing the observer access to the low quality data format via PSTN (Public Switched Telephone Network), an audio chat session on the Internet or by means of an audio-only version of the SOUNDSTREAK software.

In further embodiments, SOUNDSTREAK can be used by production managers to direct participants other than a talent or other performer. For example, it is readily contemplated that a live remote video production may be managed in place of a recording session at a fixed, designated location, using SOUNDSTREAK functionality as described herein above. For instance, SOUNDSTREAK may be used by news directors to manage remotely-located cameramen who are collecting live audio-video feeds from one or more disparate locations. In these and other embodiments herein, SOUNDSTREAK may be run on mobile devices (such as smartphones, portable computers, and the like) having suitable hardware capabilities, which communicate over one or more of cellular telephone networks, Wi-Fi networks, satellite communications networks, and any other wireless technology.

Note that all SOUNDSTREAK functionalities described above with respect to audio, namely: (1) combining low-quality data format (for speed of transfer and monitoring) with high-quality capture and asynchronous transfer of recordings (for best possible quality), (2) applying edits from one version of a recording to a second version of the same recording in another format, and (3) automatically opening files into an editor as they are transferred, may be applied equally to animated productions, video productions and audio-visual productions. In one such embodiment, a HD webcam is used to conduct a videoconference (e.g., of the type employed by SKYPE, GOTOMEETING, FACETIME or the like). The video signal in each direction is simultaneously transferred as a low-quality signal that allows "real-time" monitoring or communication and recorded as high-quality data format locally (at the location of the camera). During or after the recording, the high-quality format data for one or both participants can be transferred asynchronously. In another embodiment, one user can monitor video from a remote location in real-time using a streamed, low-quality version. Some or all footage can be selected and queued for transfer while the recording is in process or at a later time. Optionally, edits can be applied in real time to the low-quality recording and later applied to the high-quality recording when it has been transferred.

The SOUNDSTREAK methodology and platform is readily applicable to digital content captured and presented in a wide range of modalities, especially those that generate or utilize large quantities of data and thus require significant processing or bandwidth for timely transmission in situations where minimizing latency or lag time for transmission is important, and situations where network access or capacity may be limited.

Examples of imaging modalities that benefit from the SOUNDSTREAK methodology and platform include: video; conventional photography captured at high resolutions, 3-D photography (where two or more captures are made from slightly different vantages and later combined); light field photography and light field video, which captures direction as well as intensity of light; computational photography, where data streams such as output from multiple sensors are combined to construct a single output covering wider exposure latitude, differing spectra or partially overlapping fields of view; and virtual reality, where multi-directional or "360 degree" video and accompanying audio are captured.

For example, it may be desirable for a participant such as a producer to remotely monitor content being captured on location during the creation of a virtual reality drama. In many cases, practical constraints in network access and throughput, participant equipment and other factors make real-time or near-real-time transmission of the captured content in a high quality format impractical. In such cases, the SOUNDSTREAK platform can be used to allow the participant to monitor the action being captured in a low-quality format, which will allow the producer to monitor and discuss the material captured, participate in discussion of performances, the need for additional takes, and so on. Note the lower-quality format may take several forms, such as reduced frame-rates, reduced resolution, limited field of view (for instance 60 or 90 of the 360 degrees captured), and the like.

In another example, light field video productions can be monitored from across the room or across an ocean. In its "raw" form, the data captured by this format is extremely voluminous, resulting in high demands on storage and transmission. However, much of this data relates to factors like depth mapping, which are critical to many post-production processes but which are not needed to allow remote participants to monitor the performance or action captured by the video. In such cases, a low quality version of the content may consist of a "flattened" version of the raw data, which does not contain depth maps and other information but which is adequate for judging performances or other particulars of the capture. Alternatively, a duplicate capture can be made with a conventional video camera or a smartphone and this much more manageable data stream can be sent to participants. In such cases digital slates, time coding or other techniques can be used to create sync marks in the content.

The SOUNDSTREAK methodology and platform are also readily applicable to modalities that use sensors and receptors sensitive to inputs other than light., and which present their output as constructed images or graphic representations. Examples of such technologies include tomography (where reflection and scatter of light are interpreted), magneto-resonance imaging (MRI), which uses magnetic and radio frequencies to capture multiple views of a subject that are then combined; computerized tomography (CT) or computerized axial tomography (CAT) scans composed of images captured from multiple angles; positron emission tomography (PET) scans; ultrasound, which presents reflected sound as an image or numeric output; Light Detection and Ranging (LIDAR), which uses pulse lasers to sense objects; and similar technologies.

In an example embodiment, it may be desirable for a remote participant to view "real time" MRI output as it is captured, or to have the fastest possible access to the MRI output. In such cases, the participant can be shown a low-resolution rendering of the capture, presented with less detail or lacking the ability to shift view. This simplified output can be created by the processor of the MRI imager, and streamed or transferred as a series of Digital Imaging and Communications in Medicine (DICOM) files, or other appropriate format. Alternatively a video camera can simply be pointed at the screen of the MRI terminal, thereby using an alternate modality to easily convey the needed information. If desirable, the participant can send control signals to the MRI terminal through a communication channel. These signals, which require very little bandwidth, can be sent directly to the MRI processor, allowing the participant to influence the view presented on the screen they are viewing through a remote camera. In either of these implementations, a separate communication channel can be used to facilitate communication between session participants. As with the current SOUNDSTREAK implementation, selected portions of the content (e.g., high-resolution data for a small area of the MRI) over the low quality or real-time data channel, or the entire capture can be transferred asynchronously to a network server or participant computer over the high quality channel.

In another example, a doctor may monitor an ultrasound session remotely. The doctor may want to see the output during rather than after the session so the ultrasound technician can be directed to return to a spot or change angles or settings. In such cases, the participant—the remote doctor—may be presented with a screen that duplicates the technician's screen and that gives her the ability to select video or still captures at various resolutions for asynchronous transfer or storage in a medical records system. If bandwidth issues require reduction of quality, this can be accomplished by reducing frame/refresh rates, reducing pixel count of individual frames, or limiting transfer to a specific quadrant of the capture.

The SOUNDSTREAK architecture is also ideal for applications requiring both routine, cursory or low-resolution review of large volumes of digital content and the ability to select specific sections of content to be examined in greater detail, either in real time or subsequently. Such applications can take many forms, including monitoring of traffic or security cameras, vital signs of hospital patients, or Global Positioning System (GPS) coordinates of a fleet of trucks, and a wide variety of other real-time data monitoring scenarios.

For example, a network of traffic cameras may be routinely used to monitor traffic flow at key intersections. For this purpose (counting cars, or gauging overall density of traffic), relatively low resolution—both pixel count and frame rate—will suffice. However, during a police alert or on other special occasions, it may be desirable to capture higher resolution to enable scanning of license plates, machine recognition of vehicle models and colors, or even image captures of drivers and passengers to use for facial recognition. In such a situation, the participant—perhaps in a central monitoring office—may want to increase the quality of the low-quality format to allow real-time processing of license plates. The participant may also choose to mark part or all of the capture, storage and transfer for later use.

In an alternate example the same network of cameras may detect a traffic accident. In this case, the participant in the monitoring center may want to make a detailed assessment of damage or look for injured passengers. In this case she might issue instructions to increase the quality of the low quality format she is receiving so as to be able to perceive finer detail. In this example it might also be desirable to capture the highest possible quality video for later transfer and use in reconstructing the accident, or for use in litigation, which can be transferred asynchronously in the high-quality data format. Note that the specifics of the use case as well as network capacity and other factors will determine how to best define "increased" quality. For reading license plates or looking for injured passengers, low frame rates with higher resolution may be the preferred choice, while increased frame rates might be more useful if the cars on the bridge are moving very quickly, or if a second-by-second reconstruction of events will be needed.

A core aspect of the SOUNDSTREAK method and platform is the use of real-time or near-real-time transfer of low-quality format content to enable collaboration, combined with asynchronous transfer of high-quality format content to ensure uncompromised quality. How this idea is best achieved will be specific to use case, modality and circumstances.

In cases involving audio, the SOUNDSTREAK platform can use the low-quality channel to simultaneously enable both monitoring by a participant and the exchange of comments or other verbal communication. For modalities other than audio, low-quality formats allow real-time monitoring and synchronized playback of local content on each participant's computer, but are not appropriate for communication between participants. Where verbal communication cannot be facilitated via the low-quality format, a separate "communication data format" can be established, and used to exchange at least one of verbal comments between participants and command and control signals between computers. Analogously, in the current SOUNDSTREAK platform, talent location computer generates three audio formats: a high quality audio file (which is optionally transferred asynchronously during or after the session), a first low-quality format used to rapidly transfer the content of the take to participants when recording stops (and thus facilitate synchronized playback of local content across participant computers), and a second low-quality format for real-time monitoring and verbal communication.

In some cases, a communication channel will convey control signals to devices at the capture location. In the SOUNDSTREAK platform, control of record, start, stop, playback, and so on at the capture location is controlled by a participant through the SOUNDSTREAK platform, via a server communicating with participant computers. The concept of managing and controlling devices at the capture location remotely can take many forms, depending on modality. For instance a communication channel might be used to converse with technicians at the capture location or to directly control motorized zooms, set lighting levels, adjust camera settings, and so on.

Many of the embodiments described herein may require the capture, transmission and storage of information that is not itself part of the digital content. Examples include edit lists, mark-ups of images or video, annotations, and so on. In these embodiments a separate data communication format may be required to convey such information without including it in the presentation or storage of digital content.

The established principles of the SOUNDSTREAK methodology will be most usefully applied differently for each modality. In particular, considerations such as individual user needs, general circumstances and available network bandwidth will shape the definition of "low quality" used in a specific instance. There are countless ways in which a high-quality capture can be modified to reduce file size, processing loads, bandwidth requirements, and transfer times of a low-quality image. These choices are specific to the nature of the content, the modality of the original capture, the needs of participants, circumstances, and so on. Many examples of alternate definitions of low-quality are offered herein, but it is useful to examine a specific example as an indication of the range of choices in any given modality.

To illustrate the point, consider the use of live remote video monitoring used in a telemedicine application. The patient and a practitioner are at a remote clinic (the capture site) and a consulting specialist (participant) is remotely consulting on a diagnosis. In its simplest form, a person at the capture site is operating a video camera or smart phone according to instructions received over a communication channel, and transmitting video to the participant. Alternatively, the participant may be operating a remotely-controlled zoom/pan/tilt capability on an unmanned camera. The diagnostic procedure consists of an interview as well as visual inspection of skin lesions. Because of the remote location, the network connection is a relatively low-bandwidth cellular data link. For liability and training reasons high-resolution video may later be needed.

In this case, the high-quality capture can be translated into a low-quality format in several ways. Frame rate can be reduced. The pixel count of each frame can be reduced. The portion of the frame being sent can be reduced such that resolution remains as high as possible but field of view is reduced. The bit-depth of the video can be reduced, resulting in less color gradations but otherwise unmodified video. Various compression techniques or formats can be used—the file can be converted to MP4 or some other format. Note that some or all of these techniques can be combined as needed.

In this example, quality requirements for monitoring of the interview by the consulting specialist are modest. However there may also be moments during the procedure when greater resolution is needed, for example to allow the consulting specialist to closely examine a lesion. In this case, the highest possible resolution and bit depth (for color accuracy) may be of the highest importance, while frame rate matters less. In this example, it may be useful to shift the definition of low-quality data format during these select moments.

Alternatively, the practitioner at the capture site may be performing a surgical procedure under the guidance of the consulting specialist. In this case minimizing latency and keeping frame rate high might be of the utmost importance, while resolution and bit depth (color accuracy) are secondary. Note that in this case, the optimal form of low-quality may change during the session, for instance after the procedure the consulting specialist may want to switch to a high-latency, high-resolution view to make sure the procedure is satisfactorily completed.

In either example, network conditions may vary during the session. In some cases it will be desirable to adjust the low-quality format dynamically, at stated intervals, or in response to other triggers.

These examples illustrate some of the ways in which video can be translated into a low-quality format. An informed reader will recognize that alternate modalities and use cases will present alternate choices of how to reduce quality, and that circumstances will influence the most appropriate choice among these alternatives.

Another core aspect of the SOUNDSTREAK platform is the enablement of remote collaboration through synchronization across users, such that participants see and hear the same things at the same times. In the current SOUNDSTREAK platform this is accomplished through a combination of locally-stored low-quality format content, locally stored backing assets, streamed content and command and control signals. These elements allow a highly collaborative user experience—one participant can control capture and playback for all participants, and all participants see and hear the same things at the same time.

These concepts and capabilities are equally applicable to shared viewing of existing content, collaborative editing, collaborative adjustment of attributes such as color balance, and so on in video productions. For example, SOUNDSTREAK can be used to view "dailies" or raw footage captured during an earlier shoot. Participants can view the raw footage on synchronized players, enabled either by locally stored instances of the footage or by simultaneous streaming from a central server. A single participant can control the experience for all, including the loading of video, audio or other digital content files, playback, fast forward and rewind, queuing and scrubbing, and the like.

For example, SOUNDSTREAK can enable real time collaborative editing sessions. Raw footage, audio elements such as music and effects tracks, or other elements of a finished output are distributed to participant computers. A communication channel allows participants to exchange comments via audio, text or video chat. Utilizing time coding or another sync method, one or more participant controls the creation of an edit list that describes assembly of the elements into a rough cut or final cut of the finished product. A single participant may control playback, queuing and scrubbing, fast-forward, etc. for all participants such that each sees and hears the same thing at the same time. Commands to perform related functions such as exporting a compiled video can also be generated by a single participant and executed on all participant computers. In this way, remote participants can collaborate as if they were together in a single editing room.

Alternatively, much the same effect can be achieved by streaming the assembled edit from one computer to all session participants. In this embodiment, workflow and participant experience remain largely unchanged, but no local versions of source footage or other elements are required. Instead, the raw footage and other elements are stored on a computer on the data network (such as a remote server, or a participant computer). Edit lists may be used to compile a low-quality assembly of an edit on this computer, and this is streamed to participants via the data network. Exported rough cuts or final cuts may then be sent to participant computers or other locations asynchronously.

In another illustrative embodiment, SOUNDSTREAK can be used to enable collaborative review of dailies or existing video footage. Footage can be transferred to participants in low-quality format, with or without time coding or other sync marks. Participants can then use a communication channel to discuss particular takes or sections of footage, and can create and share mark-ups, annotations and the like. Optionally, these markups and annotations can be saved as meta-data associated with at least one of the low-quality format files and the original digital content from which they were generated.

The idea of collaborative mark-ups and annotation of existing digital content is extensible to a variety of modalities, in each case taking a form appropriate to the modality. For example, the well-known RAW photograph file formats can be converted locally on participants' computers, using shared conversion settings exchanged on a communication channel. In this way, each participant can see an exact rendering of the selected settings at the same time. Once agreed upon, these settings can be saved as meta-data associated with the digital content.

As described in the foregoing, SOUNDSTREAK enables collaborative editing sessions by combining low-quality data format for real-time communication with asynchronous transfer of high-quality data format to deliver uncompromised quality. In various embodiments, SOUNDSTREAK may be used in conjunction with separate available software editing tools to accomplish the functions described herein. Accordingly, SOUNDSTREAK may include native editing code/functions or may act as a plug-in to (or otherwise compatible with) existing third-party editing tools.

Although the best methodologies have been particularly described in the foregoing disclosure, it is to be understood that such descriptions have been provided for purposes of illustration only, and that other variations both in form and in detail can be made by those skilled in the art without departing from the spirit and scope thereof, which is defined first and foremost by the appended claims.

What is claimed is:

1. A mobile apparatus comprising:
a capture device comprising a sensor;
a wireless network interface having a lower bandwidth communication channel and a higher bandwidth communication channel;
a processor; and
a memory configured to store instructions that are executable by the processor to:
direct the sensor of the capture device to capture digital content corresponding to a live event;
execute control signals received via a transceiver from a remotely located control device using the lower bandwidth communication channel, the processor, responsive to the control signals, configured to control a multi-directional location of the mobile apparatus during the live event;
store at least a portion of the digital content in a high quality data format in the memory while initiating streaming of at least a portion of the digital content in a low quality data format via at least one of the lower bandwidth communication channel and the higher bandwidth communication channel to the remotely located control device; and
during the live event, initiate transmission of the digital content stored in the memory in the high quality data format to a storage device via the higher bandwidth communication channel.

2. The apparatus of claim 1, the instructions further executable by the processor to:
establish a communication data format for receiving communication data via the network interface using the low quality data format, the communication data comprising at least one of: verbal communication, text communication, and video communication.

3. The apparatus of claim 2, the communication data further comprising additional control signals for at least one of editing devices, live event production equipment and lighting equipment.

4. The apparatus of claim 2, the communication data further comprising at least one of: edit lists, mark-ups, annotations, image adjustments and meta-data.

5. The apparatus of claim 1, where the digital content comprises at least one of: video data, three-dimensional (3D) video data, 3D photograph data, virtual reality data, medical diagnostic data, magneto-resonance imaging (MRI) data, tomography imaging data, light field video data, light field photography data, computational imaging video data, computational imaging photograph data and telemetry data.

6. The apparatus of claim 1, where the low quality data format comprises at least one of:
OPUS, MP3, VORBIS, MUSEPACK, AAC, ATRAC Lossy and WMA Lossy.

7. The apparatus of claim 1, where the high quality data format comprises at least one of:
AVI, WAV, AIFF, AU, PCM, FLAC, APE, WavPack, TTA, ATRAC Advanced Lossless, M4A, MPEG-4 SLS, MPEG-4 ALS, MPEG-4 DST, WMA Lossless, and Shorten (SHN).

8. The apparatus of claim 1, where the digital content is captured by separate capture devices for the low quality data format and the high quality data format.

9. The apparatus of claim 1, wherein the network interface comprises:
a first network interface configured to transmit the digital content in the low quality data format; and
a second network interface configured to transmit the digital content in the high quality data format.

10. The apparatus of claim 1, wherein at least one of the low quality data format and the high quality data format is used in connection with sync information.

11. The apparatus of claim 1, wherein the low quality data format is selected to produce a balance of data quality and transmission latency with respect to transmission of the digital content.

12. The apparatus of claim 11, wherein an adjustment of the balance is triggered by at least one of: changes in network conditions, changes in content, and specified intervals of time.

13. The apparatus of claim 11, wherein the low quality data format is modified with respect to particular segments of the digital content.

14. The apparatus of claim 1, wherein the digital content further comprises data related to the live event, the live event captured with a pre-recorded backing that includes at least one of: audio data, video data, and audiovisual data.

15. The apparatus of claim 1, the instructions further executable by the processor to:
store portions of the digital content as separate, individual data files; and
transmit at least one of the portions of the digital content to a participant computer, wherein the portions of the digital content are configured to be assembled at a designated storage location of the storage device.

16. The apparatus of claim 1, the instructions further executable by the processor to:
receive the digital content in at least one of the low quality data format and the high quality data format;
present the digital content to at least one of a participant via a participant computer and a session observer via a session observer computer over a data communication network; and
enable at least one of playback, starting, stopping, pausing, resuming, rewinding, and fast-forwarding of the digital content, in substantial synchronization, on at least one of the participant computer and the session observer computer.

17. The apparatus of claim 1, wherein streaming the low quality data format further comprises streaming the low quality data format in conjunction with any processing latency, network lag and programmed transmission delay.

18. The apparatus of claim 1, wherein the capture device is located at a separate capture location than the processor.

19. A mobile apparatus comprising:
a capture device;
a network interface;
a processor; and
a memory configured to store instructions that are executable by the processor to:
store digital content in a first quality data format after the digital content is received from a sensor of the capture device, the digital content related to a live event;
execute control signals received via a transceiver from a remotely located control device using a lower bandwidth communication channel, the processor, responsive to the control signals, configured to control a multi-directional location of the mobile apparatus during the live event; and receive communication data transmitted via the network interface from a participant computer in a second quality data format during the live event, wherein the apparatus is configured to transmit the communication data received in the second quality data format in real-time or near real-time with the digital content to the participant computer and wherein the communication data received in the second quality data format is distinct from the digital content stored in the first quality data format.

20. A mobile apparatus comprising:
a capture device;
a network interface;
a processor; and
a memory configured to store instructions that are executable by the processor to:
direct a sensor of the capture device to capture digital content data related to a live event;
execute control signals received via a transceiver from a remotely located control device using a lower bandwidth communication channel, the processor, responsive to the control signals, configured to control a multi-directional location of the mobile apparatus during the live event;
direct the memory to store the digital content in a first quality data format;
direct the memory to store at least one of audio data and video data for transmitting via the network interface to a participant computer over a data communication network in a second data quality format, the at least one of audio data and video data presented in real-time or near real-time during the live event and is distinct from the digital content stored in the first quality data format; and
automatically initiate transmission of at least a portion of the digital content with at least a portion of the audio data and the video data to a designated location via the network interface in the first quality data format.

* * * * *